United States Patent
Likura et al.

(10) Patent No.: US 9,141,452 B2
(45) Date of Patent: Sep. 22, 2015

(54) FAILURE DETECTION METHOD AND FAILURE DETECTION SYSTEM

(71) Applicant: FUJITSU LIMITED, Kawasaki-shi (JP)

(72) Inventors: Fumi Likura, Shinagawa (JP); Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 13/687,579

(22) Filed: Nov. 28, 2012

(65) Prior Publication Data

US 2013/0159790 A1     Jun. 20, 2013

(30) Foreign Application Priority Data

Dec. 19, 2011  (JP) ................................. 2011-276892

(51) Int. Cl.
  *G06F 11/00*   (2006.01)
  *G06F 11/07*   (2006.01)

(52) U.S. Cl.
  CPC .......... *G06F 11/006* (2013.01); *G06F 11/0751* (2013.01)

(58) Field of Classification Search
  USPC .......................................................... 714/48
  See application file for complete search history.

(56) References Cited

U.S. PATENT DOCUMENTS

| | | | | |
|---|---|---|---|---|
| 2005/0021740 | A1* | 1/2005 | Bar et al. | 709/224 |
| 2006/0256714 | A1* | 11/2006 | Takagi | 370/224 |
| 2007/0100586 | A1* | 5/2007 | Cheng et al. | 702/185 |
| 2008/0109686 | A1* | 5/2008 | Nikaido et al. | 714/57 |
| 2008/0162272 | A1* | 7/2008 | Huang et al. | 705/11 |
| 2011/0208679 | A1* | 8/2011 | Watanabe et al. | 706/12 |

FOREIGN PATENT DOCUMENTS

| | | |
|---|---|---|
| JP | 9-22368 | 1/1997 |
| JP | 2006-318071 | 11/2006 |
| JP | 2010-182044 | 8/2010 |
| JP | 2011-170802 | 9/2011 |

\* cited by examiner

*Primary Examiner* — Kamini Patel
(74) *Attorney, Agent, or Firm* — Staas & Halsey LLP

(57) ABSTRACT

A failure detection method executed by a system having a plurality of nodes and detecting failures at an information processing device base on a plurality of types of messages output by the information processing device, the method includes collecting messages belonging to a first set, which is a part of the plurality of types, at a first node; collecting messages belonging to a second set different from the first set, which is a part of the plurality of types, at a second node; generating first failure candidate information based on messages of the type belonging to the first set, collected at the first node; generating second failure candidate information based on messages of the type belonging to the second set, collected at the second node; and detecting failure at the information processing device, based on the first failure candidate information and the second failure candidate information.

19 Claims, 29 Drawing Sheets

FIG. 6

| DISTRIBUTION TABLE | |
|---|---|
| MESSAGE NUMBER | SERVER NUMBER |
| 2 | 2 |
| 3 | 1 |
| 4 | 2 |
| 5 | 1 |
| 6 | 2 |
| 7 | 1 |
| 8 | 2 |

CANDIDATE PATTERN TABLE 211

| FAILURE NUMBER | RELATED MESSAGE NUMBER | BRANCH NUMBER | CANDIDATE PATTERN |
|---|---|---|---|
| 1 | 3,5,7 | 1-1 | – |
|   |   | 1-2 | 3,5 |
|   |   | 1-3 | 7 |
| 2 | 3 | 2-1 | 3 |
| ... | ... | ... | ... |

FIG. 7B

CANDIDATE PATTERN TABLE 211a

| FAILURE NUMBER | RELATED MESSAGE NUMBER | BRANCH NUMBER | CANDIDATE PATTERN |
|---|---|---|---|
| 1 | 2,4,6 | 1-1 | 2,4,6 |
|   |   | 1-2 | 2,6 |
|   |   | 1-3 | 2,4,6 |
| 2 | 2,8 | 2-1 | 2,8 |
| ... | ... | ... | ... |

| COMPOSITE PATTERN TABLE ||||
| FAILURE NUMBER | BRANCH NUMBER | COMPOSITE PATTERN | FAILURE CONTENTS |
| --- | --- | --- | --- |
| 1 | 1-1 | 2:1-1 | WEB SERVICE ABC UNAVAILABLE |
|  | 1-2 | 1:1-2, 2:1-2 |  |
|  | 1-3 | 1:1-3, 2:1-3 |  |
| 2 | 2-1 | 1:2-1, 2:2-1 | DATABASE SERVER HDD FAILURE |
| ... | ... | ... | ... |

CANDIDATE PATTERN NOTIFICATION DATA

| SERVER NUMBER | START POINT-IN-TIME | END POINT-IN-TIME | BRANCH NUMBER |
|---|---|---|---|
|  |  |  |  |
| 1 | 2011/7/25 10:58:30 | 2011/7/25 10:58:34 | 1-2 |
|  |  |  |  |
| 2 | 2011/7/25 10:58:32 | 2011/7/25 10:58:33 | 1-2 |
|  |  |  |  |
| 1 | - | - | ¬1 |

FIG. 17A

DISTRIBUTION TABLE (131)

| msg NUMBER | DISTRIBUTION DESTINATION SERVER |
|---|---|
| 2 | 2 |
| 3 | 1 |
| 4 | 2 |
| ... | ... |

FIG. 17B

CANDIDATE PATTERN TABLE (211)

| FAILURE NUMBER | RELATED msg | BRANCH NUMBER | CANDIDATE PATTERN |
|---|---|---|---|
| 2 | 3, 5 | 2-1 | 3 |
|   |      | 2-2 | 5 |

R1  R2  R3

CANDIDATE PATTERN TABLE (211a)

| FAILURE NUMBER | RELATED msg | BRANCH NUMBER | CANDIDATE PATTERN |
|---|---|---|---|
| 2 | 2,8 | 2-1 | 2,8 |
|   |     | 2-2 | 2,8 |

R4  R5

COMPOSITE PATTERN TABLE (311)

| FAILURE NUMBER | RELATED msg | COMPOSITE PATTERN |
|---|---|---|
| 2 | 2-1 | 1:2-1, 2:2-1 |
|   | 2-2 | 1:2-2, 2:2-2 |

PRE-DIVISION PATTERN TABLE 511

| FAILURE NUMBER | BRANCH NUMBER | PRE-DIVISION PATTERN | FAILURE CONTENTS |
|---|---|---|---|
| 1 | 1-1 | 2,4,6 | WEB SERVICE ABC UNAVAILABLE |
| | 1-2 | 2,3,5,6 | |
| | 1-3 | 2,4,6,7 | |
| 2 | 2-1 | 2,3,8 | DATABASE SERVER HDD FAILURE |
| ... | ... | ... | ... |

FIG. 23

| MESSAGE FREQUENCY TABLE | |
|---|---|
| MESSAGE NUMBER | FREQUENCY OF APPEARANCE |
| 6 | 61 |
| 3 | 57 |
| 7 | 32 |
| 5 | 25 |
| 2 | 7 |
| 4 | 2 |

| CANDIDATE PATTERN TABLE | | | | 212 |
|---|---|---|---|---|
| FAILURE NUMBER | RELATED MESSAGE | BRANCH NUMBER | CANDIDATE PATTERN | |
| 1 | 5 | 1-1 | – | |
| | | 1-2 | 5 | |
| | | 1-3 | – | |

FIG. 26B

| CANDIDATE PATTERN TABLE | | | | 212a |
|---|---|---|---|---|
| FAILURE NUMBER | RELATED MESSAGE | BRANCH NUMBER | CANDIDATE PATTERN | |
| 1 | 3,7 | 1-1 | – | |
| | | 1-2 | 3 | |
| | | 1-3 | 7 | |

FIG. 26C

| CANDIDATE PATTERN TABLE | | | | 212b |
|---|---|---|---|---|
| FAILURE NUMBER | RELATED MESSAGE | BRANCH NUMBER | CANDIDATE PATTERN | |
| 1 | 2,6 | 1-1 | 2,6 | |
| | | 1-2 | 2,6 | |
| | | 1-3 | 2,6 | |

FIG. 26D

| CANDIDATE PATTERN TABLE | | | | 212c |
|---|---|---|---|---|
| FAILURE NUMBER | RELATED MESSAGE | BRANCH NUMBER | CANDIDATE PATTERN | |
| 1 | 4 | 1-1 | 4 | |
| | | 1-2 | – | |
| | | 1-3 | 4 | |

FIG. 27A

| CANDIDATE PATTERN TABLE ||| 311a |
|---|---|---|
| FAILURE NUMBER | BRANCH NUMBER | COMPOSITE PATTERN |
| 1 | 1-1 | — |
|  | 1-2 | 1:1:1-2, 1:2:1-2 |
|  | 1-3 | 1:2:1-3 |

FIG. 27B

| CANDIDATE PATTERN TABLE ||| 311b |
|---|---|---|
| FAILURE NUMBER | BRANCH NUMBER | COMPOSITE PATTERN |
| 1 | 1-1 | 2:1:1-1, 2:2:1-1 |
|  | 1-2 | 2:1:1-2 |
|  | 1-3 | 2:1:1-3, 2:2:1-3 |

FIG. 28A

CANDIDATE PATTERN NOTIFICATION DATA

| SERVER NUMBER | START POINT-IN-TIME | END POINT-IN-TIME | BRANCH NUMBER |
|---|---|---|---|
| 1:1 | 2011/7/25 10:58:34 | 2011/7/25 10:58:34 | 1-2 |
| 1:2 | 2011/7/25 10:58:30 | 2011/7/25 10:58:30 | 1-2 |
| 2:1 | 2011/7/25 10:58:32 | 2011/7/25 10:58:33 | 1-2 |

FIG. 28B

CANDIDATE PATTERN NOTIFICATION DATA

| SERVER NUMBER | START POINT-IN-TIME | END POINT-IN-TIME | BRANCH NUMBER |
|---|---|---|---|
| 1 | 2011/7/25 10:58:30 | 2011/7/25 10:58:34 | 1-2 |
| 2 | 2011/7/25 10:58:32 | 2011/7/25 10:58:33 | 1-2 |

FAILURE DETECTION METHOD AND FAILURE DETECTION SYSTEM

CROSS-REFERENCE TO RELATED APPLICATION(S)

This application is based upon and claims the benefit of priority of the prior Japanese Patent Application No. 2011-276892, filed on Dec. 19, 2011, the entire contents of which are incorporated herein by reference.

FIELD

The embodiments discussed herein are related to a failure detection method and a failure detection system.

BACKGROUND

Currently, information processing systems where multiple information processing devices are coupled via a network are in use. With information processing system, operation motoring of hardware and software in devices included in the system may be performed. Performing operation motoring enables failure occurring at one of the devices to be detected at an early stage.

Various ways of detecting failure have been conceived. For example, a certain pattern may be detected from multiple types of messages output from information processing devices, and failure corresponding to the pattern may be detected. Specifically, there are methods for detecting a pattern which is different from a normal message pattern, and for detecting an abnormal message pattern.

With the case of the former, a proposal has been made regarding a discrete system, where messages of a pattern different from that generated when the discrete system is being operated normally are detected as an abnormality, thereby accurately detecting an abnormality which has to be dealt with out of a great number of messages.

With the case of the latter, a proposal has been made to generate a failure pattern message based on log messages which components of the information processing system have output, taking into consideration the degree of correlation between the components.

Also, there has been made a proposal to prepare multiple determination rules for determining system failures (for compete match determination and for partial match determination), so that even in the event that compete match determination conditions are not totally satisfied, a list of failure cause candidates can be displayed using the partial match determination conditions.

Further, there has been made a proposal regarding a diagnosis method for calculator system hardware and the like, where a series of diagnosis processing is divided into several processes, and diagnosis is performed using multiple diagnosis modules which independently perform the divided processes.

Examples of related art include Japanese Laid-open Patent Publication No. 2006-318071, Japanese Laid-open Patent Publication No. 2011-170802, Japanese Laid-open Patent Publication No. 2010-182044, Japanese Laid-open Patent Publication No. 9-22368, and so forth.

SUMMARY

According to an aspect of the invention, a failure detection method executed by a system having a plurality of nodes and detecting failures at an information processing device base on a plurality of types of messages output by the information processing device, the method includes collecting messages belonging to a first set, which is a part of the plurality of types, at a first node; collecting messages belonging to a second set different from the first set, which is a part of the plurality of types, at a second node; generating first failure candidate information based on messages of the type belonging to the first set, collected at the first node; generating second failure candidate information based on messages of the type belonging to the second set, collected at the second node; and detecting failure at the information processing device, based on the first failure candidate information and the second failure candidate information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating example of a distribution table according to the second embodiment;

FIGS. 7A and 7B are diagrams illustrating examples of candidate pattern tables according to the second embodiment;

FIG. 8 is a diagram illustrating an example of a composite pattern table according to the second embodiment;

FIGS. 17A and 17B are diagrams illustrating table update examples according to the second embodiment;

FIG. 22 is a diagram illustrating an example of a pre-division pattern table according to the fourth embodiment;

FIG. 23 is a diagram illustrating an example of a message frequency table according to the fourth embodiment;

FIGS. 26A through 26D are diagrams illustrating examples of candidate pattern tables (upstream) according to the fifth embodiment;

FIGS. 27A and 27B are diagrams illustrating examples of candidate pattern tables (mid-stream) according to the fifth embodiment;

FIGS. 28A and 28B are diagrams illustrating examples of candidate pattern notification data.

DESCRIPTION OF EMBODIMENTS

Hereinafter, embodiments will be described with reference to the drawings.

Figure 1:
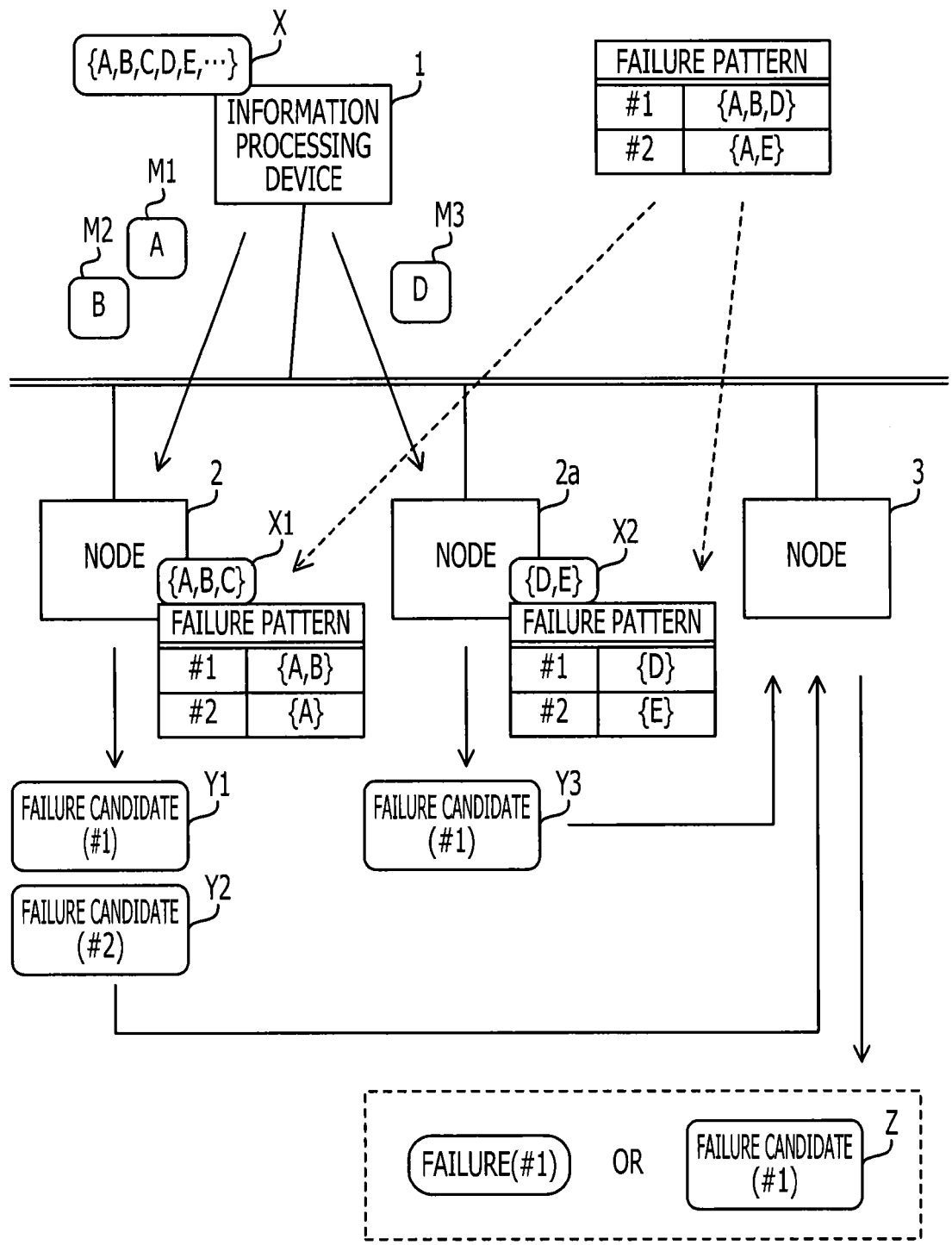
FIG. 1 is a diagram illustrating an example of an information processing system according to a first embodiment.

FIG. 1 is a diagram illustrating an example of an information processing system according to a first embodiment. As illustrated in FIG. 1, the information processing system includes an information processing device 1, and nodes 2, 2a, and 3. The information processing system detects failure at the information processing device 1 based on multiple types of messages which the information processing device 1 outputs. The information processing device 1 and nodes 2, 2a, and 3, are coupled by a network.

The information processing device 1 outputs multiple types of messages. Multiple types of messages are, for example, message regarding to hardware or software logs on the information processing device 1. The information processing device 1 outputs messages M1, M2, and M3, for example. We will say that message M1 is a type A message, message M2 is a type B message, and message M3 is a type D message. We will further say that a set {A, B, C, D, E . . . } which the information processing device 1 may output is a set X.

The node 2 collects the type of messages belonging to a set X1, which is a part of the multiple types (set X). For example, message types A, B, and C belong to the set X1. In the event that the information processing device 1 has output messages M1, M2, and M3, the node 2 collects messages M1 and M2 from the information processing device 1.

The node 2 generates failure candidate information based on the types of messages belonging to the collected set X1. The failure candidate information is information suggesting occurrence of a failure at the information processing device 1. The failure candidate information is information indicating that a part (partial pattern) of a set of message types indicating a failure cause (failure pattern) has been detected, for example.

More specifically, a failure pattern {A, B, D} corresponds to a failure indicated by failure number #1. Also, a failure pattern {A, E} corresponds to a failure indicated by failure number #2. Information in which partial pattern {A, B} is correlated with the failure number #1 and partial pattern {A} is correlated with the failure number #2, is stored in the node 2, for example. The combination of the types of messages M1 and M2 collected by the node 2 is {A, B}, which matches partial pattern {A, B} and includes partial pattern {A}. Accordingly, the node 2 generates failure candidate information Y1 relating to failure number #1, and failure candidate information Y2 relating to failure number #2. Note that partial pattern detection may be detection by complete match or detection by partial match. Here, an example of detection by partial match is illustrated, so the partial pattern {A} of the failure number #2 is also detected with regard to the set {A, B} of message types collected. In the event of detection by complete match, the partial pattern of failure number #2 will be undetected.

Node 2a collects message of types belonging to set X2 which is a part of multiple types (set X) but is different from set X1. Here, to say that sets X1 and X2 differ means to say that there are no overlapping elements in the sets X1 and X2 (i.e., mutually exclusive). For example, message types D and E belong to set X2. In the event of the information processing device 1 outputting messages M1, M2, and M3, the node 2a collects the message M3 from the information processing device 1.

The node 2a generates failure candidate information, based on messages of the types belonging to the collected set X2. The node 2a generates failure candidate information in the same way as with the node 2.

For example, information in which partial pattern {D} is correlated with the failure number #1 and partial pattern {E} is correlated with the failure number #2, is stored in the node 2a. The combination of the types of message M3 collected by the node 2a is {D}, which matches partial pattern {D}. Accordingly, the node 2a generates failure candidate information Y3 relating to failure number #1.

The node 3 detects failure of the information processing device 1 based on the combination of failure candidate information generated by the node 2 and failure candidate information generated by the node 2a. Also, the node 3 generates failure candidate information Z, in which failure candidate information generated by the node 2 and failure candidate information generated by the node 2a has been consolidated. The failure candidate information Z is combined with other failure candidate information from other nodes, for example, and used for detecting failures and narrowing down failure candidate information.

Now, failure candidate information Y1 and Y3 relating to failure number #1 are generated at both nodes 2 and 2a. The node 3 detects failure of failure number #1 at the information processing device 1 from the combination of failure candidate information Y1 and Y3. On the other hand, failure candidate information Y2 relating to the failure number #2 is generated at the node 2, but no failure candidate information relating to the failure number #2 is generated at the node 2a. Accordingly, the node 3 does not detect failure of failure number #2.

Also, there may be a case where a failure pattern corresponding to failure number #1 includes types other than A, B, and D, such as {A, B, D, F, G . . . }, for example. In this case, the node 3 may consolidate the failure candidate information Y1 and Y3 and generate failure candidate information Z relating to the failure number #1. Further, a downstream node may detect failures of failure number #1 combined with information failure candidates indicating the detection results of messages of types F and G. If information in which is registered the combination of failure candidate information Y1 and Y3 regarding the failure number #1 is stored in node 3, for example, the node 3 can generate failure candidate information Z based on this information. Thus, the node 3 can narrow down the failure candidate information Y1 and Y3 to failure candidate information Z.

With the information processing system according to the first embodiment, the node 2 collects messages M1 and M2 of types A and B belonging to set X1, and failure candidate information Y1 and Y2 is generated based on the collected messages M1 and M2. Also, the node 2a collects message M3 of type D belonging to set X2, and failure candidate information Y3 is generated based on the collected message M3. The node 3 detects failure at the information processing device 1 based on the combination of failure candidate information Y1 and Y3, or failure candidate information Z in which is consolidated the failure candidate information Y1 and Y3 is generated.

Thus, increase of load on the network can be suppressed and processing can be distributed. Specifically, the same type of message is collected by one of upstream nodes 2 and 2a (e.g., there is no overlapping in elements between set X1 and set X2). The upstream nodes 2 and 2a only handle detection of failure candidates according to messages which they themselves are in charge of, and the downstream node 3 combines the failure candidates detected upstream and detects failures. Now, in the event of distributing processing of failure detection, an arrangement can be conceived where a node is assigned to a certain failure pattern, and collection of all messages included in that failure pattern is handled by that node. In this case, in the event that the same type of message is included in different failure patterns, this means that the message will be duplicated and multiple nodes will collect in duplicate. This may lead to increased load on the network between the information processing devices and nodes, which would be inefficient.

Conversely, with the information processing system according to the first embodiment, collecting the same type of message with different nodes in duplicate can be avoided. Accordingly, the number of messages or the amount of data to be sent out onto the network between the information processing device 1 and the nodes 2 and 2a can be reduced, and load on the network can be markedly suppressed as compared with the a where the message is collected in duplicate. Also, enabling failure candidates to be narrowed down in stages, processing load which each node handles can be alleviated. Thus, processing for failure detection can be efficiently distributed.

Figure 2:
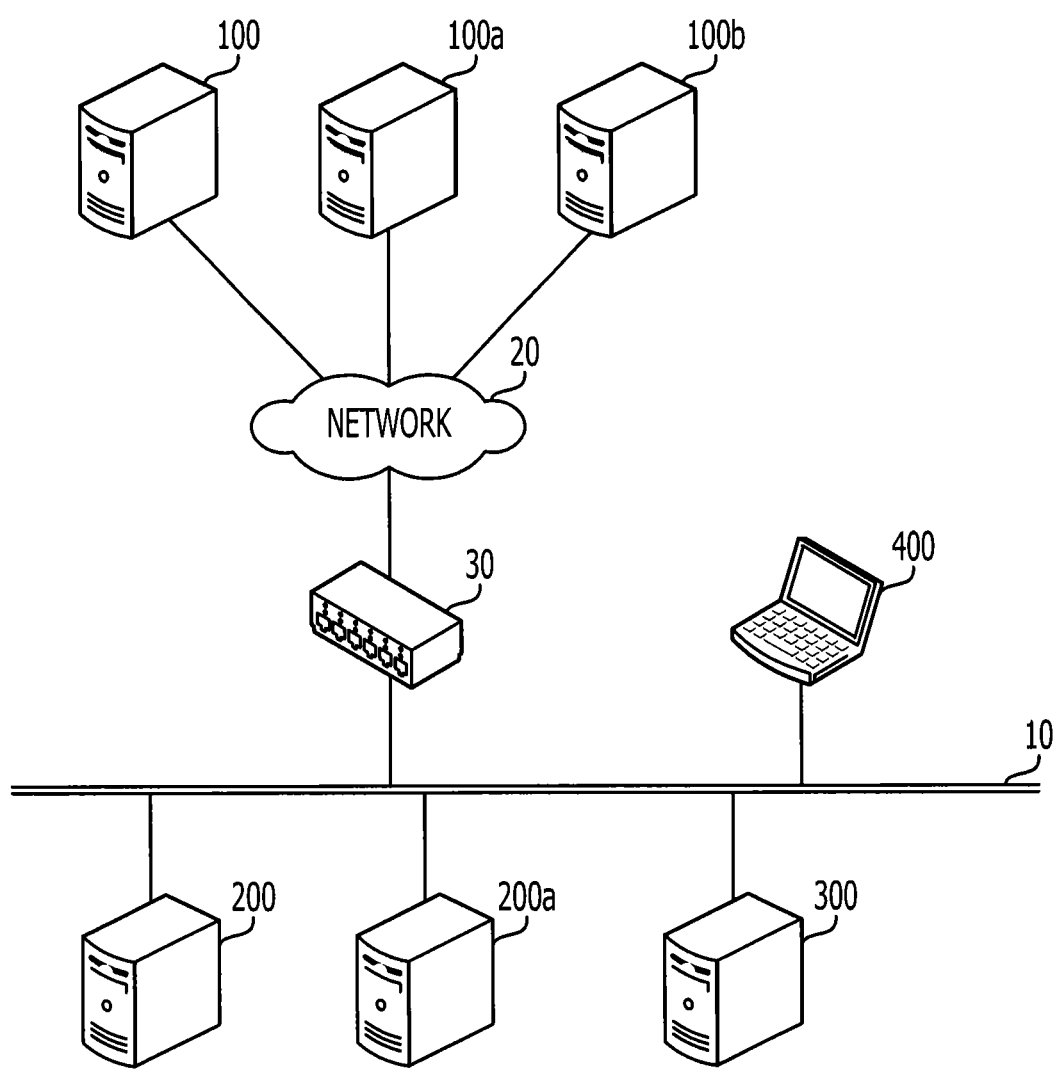
FIG. 2 is a diagram illustrating an example of an information processing system according to a second embodiment.

FIG. 2 is a diagram illustrating an example of an information processing system according to a second embodiment. With the information processing system according to the second embodiment, operation monitoring is performed of services provided by multiple server devices (hereinafter may be referred to as "servers"). To this end, messages relating to hardware or software logs of the multiple server devices are obtained, and failures based on these messages are detected.

The information processing system according to the second embodiment includes servers-to-be-monitored 100, 100a, and 100b, upstream detection servers 200 and 200a, a downstream detection server 300, and an administrating terminal device 400. The upstream detection servers 200 and 200a, downstream detection server 300, and administrating terminal device 400 are coupled to a network 10. The network 10 is a LAN (Local Area Network), for example. The servers-to-be-monitored 100, 100a, and 100b are coupled to a network 20. The network 20 is a LAN, for example. The networks 10 and 20 are coupled by a relay device 30. The relay device 30 is a switch, router, or the like relaying communication between the networks 10 and 20.

The servers-to-be-monitored 100, 100a, and 100b are server computers which mutually cooperate to execute a predetermined service. One example of this service is Web service. In this case, the server-to-be-monitored 100 is, for example, a Web server providing GUI (Graphical User Interface) to a browser of a client device (omitted from illustration) coupled to the network 20. The server-to-be-monitored 100a is, for example, an AP (APplication) server executing processing based on requests input at a Web server. The server-to-be-monitored 100b is, for example, a DB (DataBase) server which performs referencing and updating of databases, based on requests from an AP server.

The servers-to-be-monitored 100, 100a, and 100b output logs relating to hardware or software no each server.

The upstream detection servers 200 and 200a are server computers which collect information of messages output from the servers-to-be-monitored 100, 100a, and 100b. The upstream detection servers 200 and 200a detect patterns of failure candidates from the information of the collected messages, and generate failure candidate information.

The downstream detection server 300 is a server computer which detects failure of the servers-to-be-monitored 100, 100a, and 100b. The downstream detection server 300 obtains the failure candidate information generated by the upstream detection servers 200 and 200a, and detects failure of the servers-to-be-monitored 100, 100a, and 100b based on combinations of the failure candidates information. The downstream detection server 300 notifies the administrating terminal device 400 of the detected failure.

The administrating terminal device 400 is a client computer which the administrator of the information processing system according to the second embodiment uses. The administrating terminal device 400 presents the administrator with the contents of the failure notified from the downstream detection server 300. Also, the administrating terminal device 400 can also input to the upstream detection servers 200 and 200a and the downstream detection server 300 a time range over which it wants to analyze messages. Hereinafter, this time range may be referred to as "time window".

Figure 3:
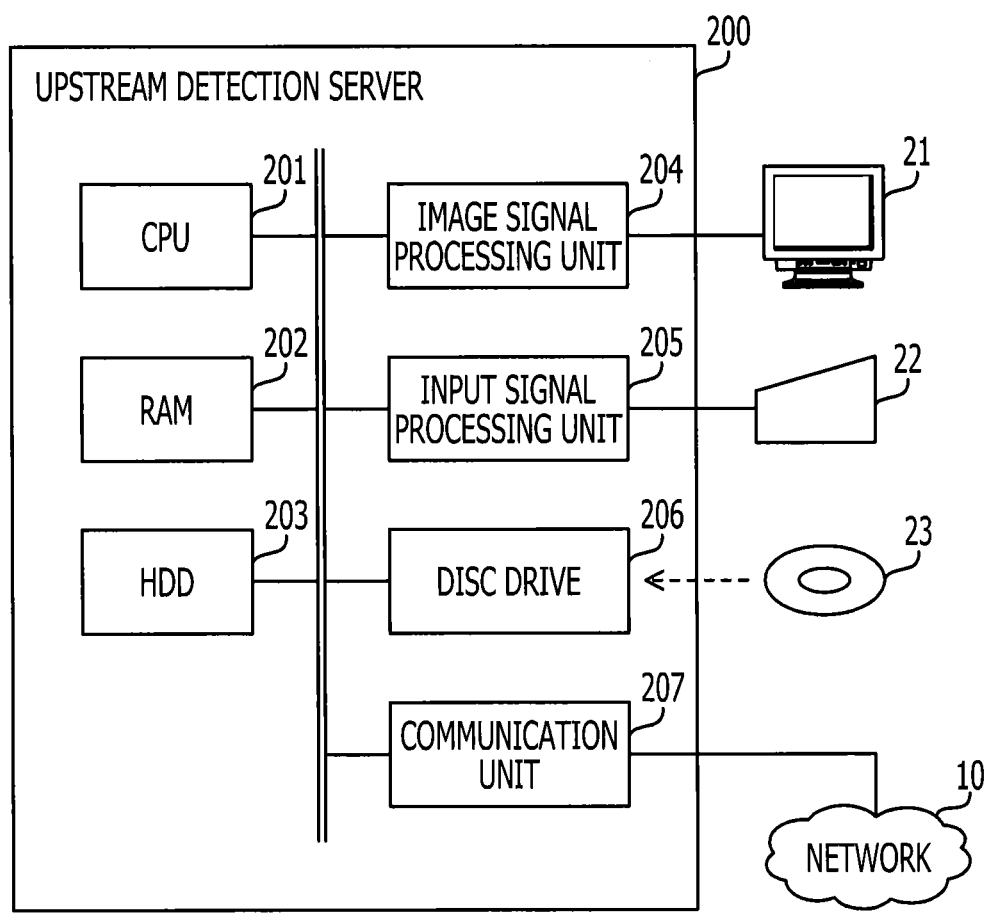
FIG. 3 is a diagram illustrating an example of upstream detection server hardware according to the second embodiment.

FIG. 3 is a diagram illustrating an example of hardware of an upstream detection server, according to the second embodiment. The upstream detection server 200 includes a CPU (Central Processing Unit) 201, RAM (Random Access Memory) 202, an HDD (Hard Disk Drive) 203, an image signal processing unit 204, an input signal processing unit 205, a disk drive 206, and a communication unit 207. The units are coupled to a bus of the upstream detection server 200. The servers-to-be-monitored 100, 100a, and 100b, upstream detection server 200a, downstream detection server 300, and administrating terminal device 400, may also be realized using similar hardware as with the upstream detection server 200.

The CPU 201 is a processor to control information processing of the upstream detection server 200. The CPU 201 reads out at least part of programs and data stored in the HDD 203, loads these to the RAM 202, and executes the programs. Note that multiple processors may be provided to the upstream detection server 200 with the programs being executed in a distributed manner.

The RAM 202 is volatile memory temporarily storing programs to be executed by the CPU 201 and data to be used for the processing. Note that the upstream detection server 200 may have memory of a type other than RAM, or may have multiple memory devices.

The HDD 203 is a non-volatile storage device which stores programs such as an OS (Operating System) program and application programs, and data. The HDD 203 performs read/write of data to/from a built-in magnetic disc under commands form the CPU 201. Note that the upstream detection server 200 may have a storage device of non-volatile memory of a type other than an HDD (e.g., an SSD (Solid State Device) or the like), or may have multiple types of storage devices.

The image signal processing unit 204 outputs images to a display 21 coupled to the upstream detection server 200, under commands from the CPU 201. Examples of the display 21 include a CTR (Cathode Ray Tube) display and a liquid crystal display.

The input signal processing unit 205 obtains input signals from an input device 22 coupled to the upstream detection server 200, and outputs to the CPU 201. Examples of the input device 22 include a pointing device such as a mouse or touch panel or the like, and a keyboard, and so forth.

The disk drive 206 is a drive device which reads programs and data recorded in a recording medium 23. Examples of the recording medium 23 include magnetic disks such as an FD (Flexible Disks) and HDD and the like, optical discs such as CD (Compact Disc) and DVD (Digital Versatile Disc) and so forth, and MO (Magneto-Optical disk). The disk drive 206 stores programs and data read from the recording medium 23 in the RAM 202 and HDD 203, under commands of the CPU 201.

The communication unit 207 is an interface performing communication with the servers-to-be-monitored 100, 100a, and 100b, the downstream detection server 300 and the administrating terminal device 400 via the network. The communication unit 207 may be a cable communication information, or may be a wireless communication interface.

Figure 4:
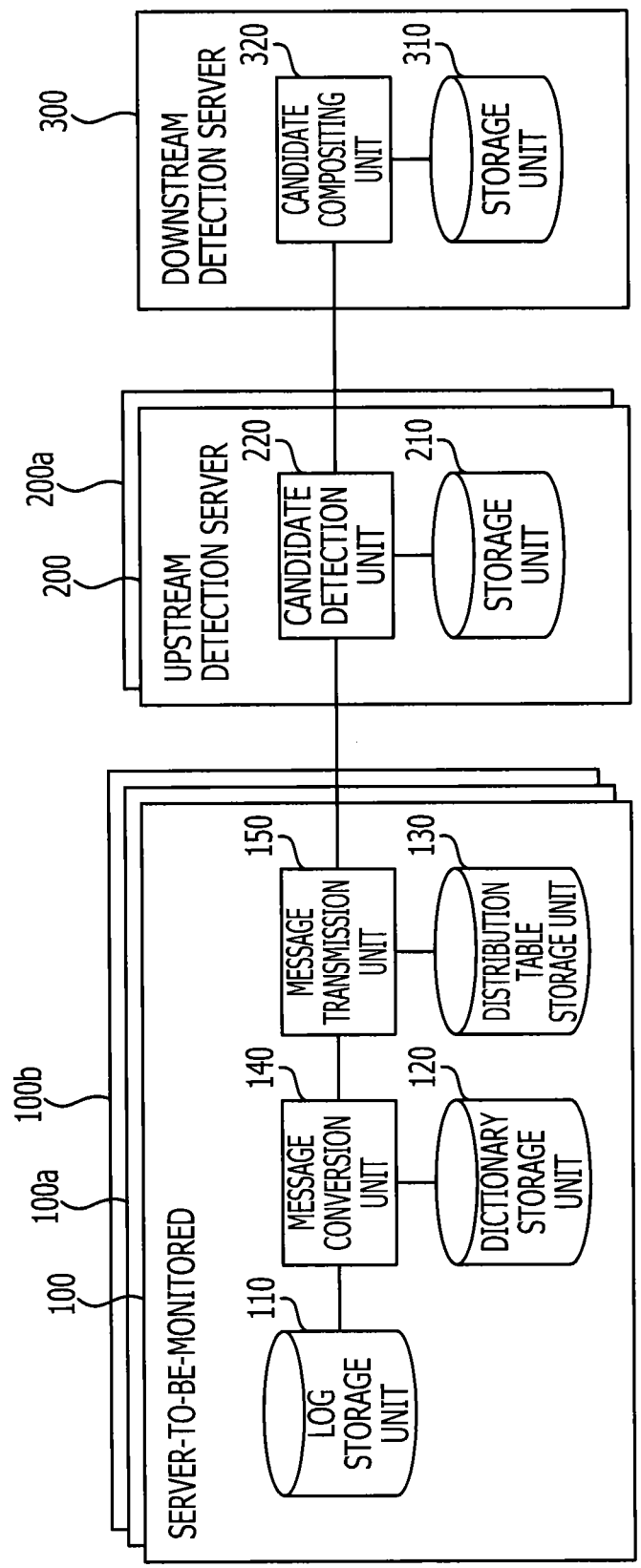
FIG. 4 is a diagram illustrating an example of software according to the second embodiment.

FIG. 4 is a diagram illustrating an example of software with the second embodiment. Part or all of the units illustrated in FIG. 4 may be modules of programs executed by the servers-to-be-monitored 100, 100a, and 100b, upstream detection servers 200 and 200a, and downstream detection server 300. Also, part or all of the units illustrated in FIG. 4 may be electronic circuits such as an FPGA (Field Programmable Gate Array) or ASIC (Application Specific Integrated Circuit) or the like. The servers-to-be-monitored 100a and 100b may also be realized using similar hardware as with the server-to-be-monitored 100. Further, the upstream detection server 200a may also be realized using similar hardware as with the upstream detection server 200.

The server-to-be-monitored 100 includes a log storage unit 110, a dictionary storage unit 120, a distribution table storage unit 130, a message conversion unit 140, and a message transmission unit 150.

The log storage unit 110 stores logs of hardware in the server-to-be-monitored 100 and software which the server-to-be-monitored 100 executes. Logs are generated and output by the software or the like (driver programs of hardware or application programs). For example, logs include text information in which is described the contents of events that have occurred (also may be called "message text"). Message text includes a time stamp indicating the point-in-time at which the event occurred.

The dictionary storage unit 120 stores a message dictionary. A message dictionary is a table for converting a message text into a message number.

The distribution table storage unit 130 stores a distribution table. A distribution table is a table in which are registered transmission destination of message numbers, in correlation with the message numbers.

The message conversion unit 140 converts a message text within a log stored in the log storage unit 110 into a message number, based on the message dictionary stored in the dictionary storage unit 120. The message conversion unit 140 outputs information of the message number to the message transmission unit 150. Information of the message number includes a time stamp included in the message text.

The message transmission unit 150 transmits the information of the message number obtained from the message conversion unit 140 to one of the upstream detection servers 200 and 200a, based on the distribution table stored in the distribution table storage unit 130. Hereinafter, information of a message number which the message transmission unit 150 transmits to the upstream detection servers 200 and 200a may be referred to as "message data". A message number indicated in message data indicates the type of that message data.

The upstream detection server 200 includes a storage unit 210 and a candidate detection unit 220.

The storage unit 210 stores a candidate pattern table. The candidate pattern table is a table in which are registered candidate patterns. A candidate pattern is a set of message numbers of failure candidates. The storage unit 210 stores message data.

The candidate detection unit 220 stores message data received from the servers-to-be-monitored 100, 100a, and 100b in the storage unit 210.

The candidate detection unit 220 detects candidate patterns from sets of message numbers notified from the servers-to-be-monitored 100, 100a, and 100b based on the candidate pattern table stored in the storage unit 210. The candidate detection unit 220 transmits information of the detected candidate patterns to the downstream detection server 300. Hereinafter, the information of candidate patterns which the candidate detection unit 220 transmits to the downstream detection server 300 may also be referred to as candidate pattern notification data.

The downstream detection server 300 includes a storage unit 310 and candidate compositing unit 320.

The storage unit 310 stores a composite pattern table. A composite pattern table is a table in which is registered a composite pattern, and contents of the failure corresponding to this composite pattern. A composite pattern is a predetermined combination of candidate patterns. The storage unit 310 stores composite pattern notification data.

The candidate compositing unit 320 stores candidate patterns received from the upstream detection servers 200 and 200a in the storage unit 310.

The candidate compositing unit 320 detects composite patterns from a set of candidate patterns notified from the upstream detection servers 200 and 200a, based on the composite pattern table stored in the storage unit 310. The candidate compositing unit 320 transmits information of a failure corresponding to the detected candidate patterns to the administrating terminal device 400.

Figure 5:
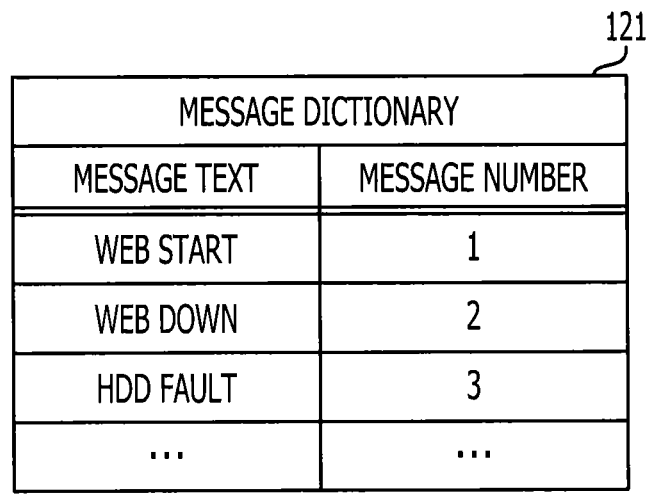
FIG. 5 is a diagram illustrating an example of a message dictionary according to the second embodiment.

FIG. 5 is a diagram illustrating an example of a message dictionary according to the second embodiment. A message dictionary 121 is stored in the dictionary storage unit 120. The message dictionary 121 includes items of message texts and message numbers.

Registered under the message text item are text strings included in the message texts. Message numbers are registered under the message number item. For example, a message number "2" is registered as to message text "Web Down".

FIG. 6 is a diagram illustrating an example of a distribution table according to the second embodiment. A distribution table 131 is stored in the distribution table storage unit 130. The distribution table 131 includes items of message numbers and server numbers.

Message numbers are registered under the message number item. One server number of a distribution target server is registered in the server number item. The server number is identification information of the distribution target server. Now, let us say that server number "1" represents the upstream detection server 200, and that server number "2" represents the upstream detection server 200a. Server number "2" is registered to message number "2" in the distribution table 131, for example. This indicates to transmit message data relating to message number "2" to the upstream detection server 200*a*.

Note that the unregistered message number "1" is not the object of collection, and the message transmission unit 150 does not transmit message data of the message number "1". The message transmission unit 150 discards information of the message number "1" obtained from the message conversion unit 140, for example.

FIGS. 7A and 7B are diagrams illustrating an example of a candidate pattern table. FIG. 7A illustrates an example of the candidate pattern table 211 held in the upstream detection server 200. The candidate pattern table 211 is stored in the storage unit 210. The candidate pattern table 211 includes items of failure number, related message number, branch number, and candidate pattern.

Failure numbers are registered under the item of failure numbers. A failure number is a number for identifying the contents of a failure. Message numbers related to the failure corresponding to the failure number (i.e., could be a candidate for the failure) are registered under the item of related message number. Branch numbers are registered under the item of branch numbers. Branch numbers are numbers for identifying multiple patterns for detecting failures. Candidate patterns are registered under the item of candidate pattern. A candidate pattern is a set of message numbers, and the order of elements (e.g., time-sequence) is irrelevant.

For example, let us say that "3", "5", and "7" are registered as message numbers relating to a failure having a failure number "1". Further, there exist three patterns capable of detecting the failure of failure number "1", these being identified by branch numbers "1-1", "1-2", and "1-3". There is no candidate pattern for branch number "1-1" (a hyphen indicating no settings is correlated therewith). Candidate pattern "3, 5" is correlated with branch number "1-2". Candidate pattern "7" is correlated with branch number "1-3".

FIG. 7B illustrates an example of a candidate pattern table 211*a* which the upstream detection server 200*a* holds. The candidate pattern table 211*a* is stored in a predetermined storage unit of the upstream detection server 200*a*. The data structure of the candidate pattern table 211*a* is the same as the data structure of the candidate pattern table 211.

For example, let us say that "2, 4, 6" are registered as message numbers relating to a failure of failure number "1". This is the same as with the candidate pattern table 211 regarding the point of being identified by branch numbers "1-1", "1-2", and "1-3", capable of detecting the failure of failure number "1". On the other hand, with the candidate pattern table 211*a*, the candidate pattern "2, 4, 6" is correlated with the branch number "1-1", and the candidate pattern "2, 6" is correlated with the branch number "1-2". The candidate pattern "2, 4, 6" is correlated with the branch number "1-3".

FIG. 8 is a diagram illustrating an example of a composite pattern table according to the second embodiment. The composite pattern table 311 is stored in the storage unit 310. The composite pattern table 311 includes the items of failure number, branch number, candidate pattern, and failure content.

Failure numbers are registered in the item of failure number. Branch numbers are registered in the item of branch number. Composite patterns are registered in the item of composite pattern. A composite pattern is a combination of candidate patterns, irrelevant to order of the candidate patterns (e.g., time-sequence). The contents of system failure are registered in the item of failure contents.

For example, a composite pattern of branch number "1-1" of failure number "1" is "2:1-1". The notation "2:1-1" indicates that the number before the colon ":" ("2" in this case) is the server number of the upstream detection server (upstream detection server 200*a* in this case). Also, the number after the colon ":" ("1-1" in this case) is the branch number corresponding to the candidate pattern detected at the upstream detection server. That is to say, the notation "2:1-1" indicates the candidate pattern "1-1" detected at the upstream detection server 200*a*.

Accordingly, the composite pattern "2:1-1" can be detected when obtaining information of the candidate pattern of branch number "1-1" from the upstream detection server 200*a*.

For example, the composite patterns of branch number "1-2" of failure number "1" are "1:1-2, 2:1-2". These composite patterns can be detected when obtaining information of candidate pattern of branch number "1-2" from the upstream detection server 200, and also obtaining information of candidate pattern of branch number "1-2" from the upstream detection server 200*a*.

For example, failure content "Web service ABC unavailable" is registered as to failure number "1" in the composite pattern table 311. This indicates that the failure "Web service ABC unavailable" was detected when detecting one of the candidate patterns of the three branch numbers of failure number "1", and will be notified to the administrating terminal device 400.

Figure 9:
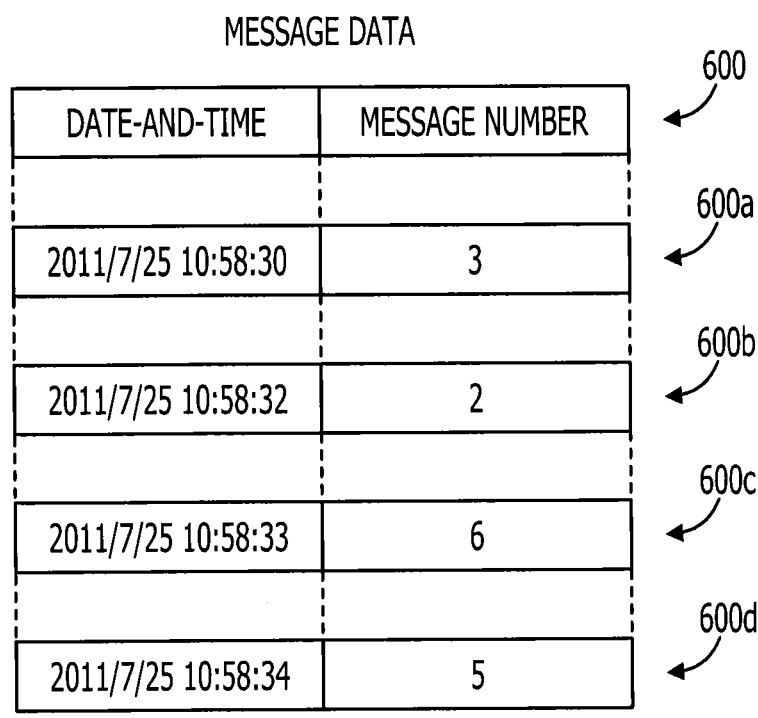
FIG. 9 is a diagram illustrating an example of message data according to the second embodiment.

FIG. 9 is a diagram illustrating an example of message data in the second embodiment. Message data 600 is data transmitted to one of the upstream detection servers 200 and 200*a* from the message transmission unit 150. The message data 600 includes items of date-and-time and message number.

The date-and-time item has set therein a time stamp (e.g., yyyy/mm/dd/hh/mm/ss) indicating the point-in-time that an event relating to a message has occurred. Message numbers are set to the item of message number.

The message data 600*a*, 600*b*, 600*c*, and 600*d* illustrates examples of cases of actual values having been set.

Message data 600*a* indicates a date-and-time of "2011/7/25 10:58:30" (30 seconds past 10:58 on Jul. 25, 2011), and a message number of "3".

Message data 600*b* indicates a date-and-time of "2011/7/25 10:58:32", and a message number of "2".

Message data 600*c* indicates a date-and-time of "2011/7/25 10:58:33", and a message number of "6".

Message data 600*d* indicates a date-and-time of "2011/7/25 10:58:34", and a message number of "5".

Now, according to the distribution table 131, the message data 600*a* and 600*d* relating to message numbers "3" and "5" are transmitted to the upstream detection server 200 (server number "1"). Also, according to the distribution table 131, the message data 600*b* and 600*c* relating to message numbers "2" and "6" are transmitted to the upstream detection server 200*a* (server number "2").

Figure 10:
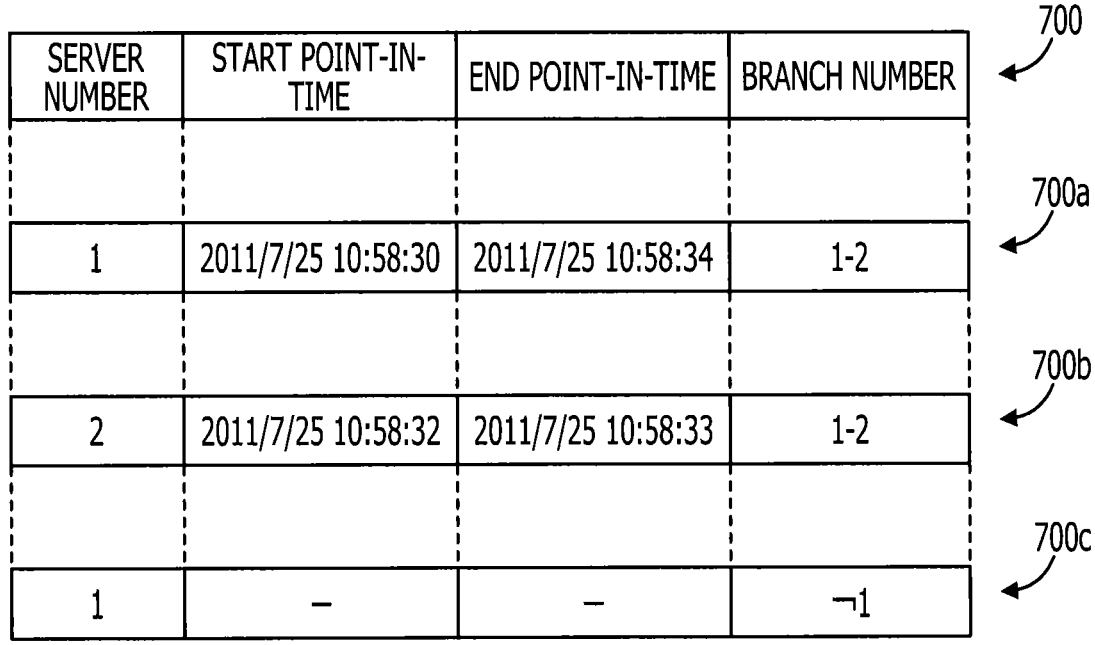
FIG. 10 is a diagram illustrating an example of candidate pattern notification data according to the second embodiment.

FIG. 10 is a diagram illustrating an example of candidate pattern notification data according to the second embodiment. This candidate pattern notification data 700 is data transmitted to the downstream detection server 300 from the candidate detecting unit 220. The candidate pattern notification data 700 includes the items of server number, start point-in-time, end point-in-time, and branch number.

The server number of the upstream detection server which has detected a candidate pattern is set to the item of server number. The earliest point-in-time out of the points-in-time of message numbers detected as candidate patterns is set to the item of start point-in-time. The latest point-in-time out of the points-in-time of message numbers detected as candidate patterns is set to the item of end point-in-time. Note that in the event that the number of message numbers to serve as candidate patterns is one, the same is set for both start point-in-time and end point-in-time. A branch number corresponding to the detected candidate pattern is set to the branch number item.

Candidate pattern notification data 700a, 700b, and 700c illustrate examples of cases where actual values have been set.

The candidate pattern notification data 700a has a server number of "1", a start point-in-time of "2011/7/25 10:58:30", an end point-in-time of "2011/7/25 10:58:34", and a branch number of "1-2". The candidate pattern notification data 700a is generated by the candidate detecting unit 220 based on the message data 600a and 600d, and transmitted to the downstream detection server 300.

The candidate pattern notification data 700b has a server number of "2", a start point-in-time of "2011/7/25 10:58:32", and end point-in-time of "2011/7/25 10:58:33", and a branch number of "1-2". The candidate pattern notification data 700b is generated by the candidate detecting unit 220 of the upstream detection server 200a based on the message data 600b and 600c, and transmitted to the downstream detection server 300.

The candidate pattern notification data 700c has a server number of "1", a hyphen "-" for start point-in-time of meaning no start point-in-time, a hyphen "-" for end point-in-time meaning no end point-in-time, and a branch number of "−1" (a combination of a negating symbol and the numeral "1"). Note that the candidate pattern notification data 700c is data for notifying a negative pattern. The numeral set along with the negating symbol is a failure number. In the event that the candidate pattern notification data 700c includes a related message corresponding to failure number "1", but the candidate detecting unit 220 did not detect all branch number candidate patterns, the candidate pattern notification data 700c is generated by that candidate detecting unit 220, and transmitted to the downstream detection server 300. A negative pattern is generated in a case that a corresponding candidate pattern is not detected, so no start point-in-time and end point-in-time of the candidate pattern notification data is set.

Next, the processing procedures of the information processing system according to the second embodiment will be described.

Figure 11:
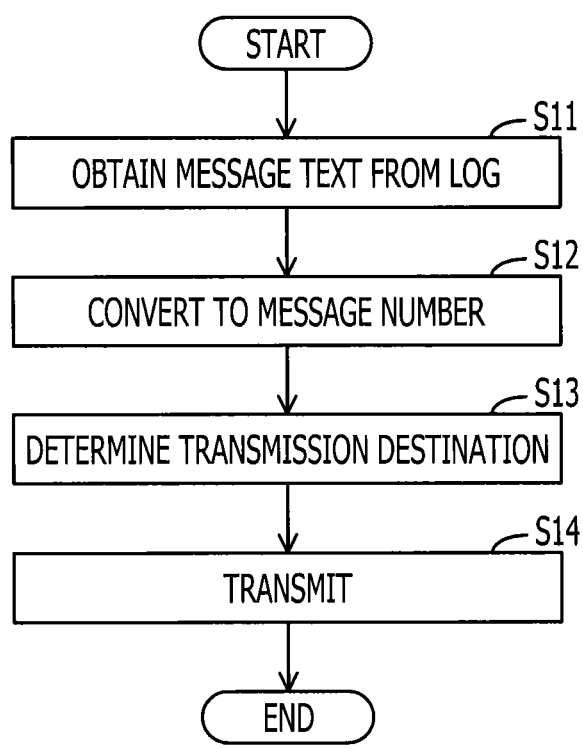
FIG. 11 is a flowchart illustrating an example of message distribution according to the second embodiment.

FIG. 11 is a flowchart illustrating an example of message distribution. Description below of the processing in FIG. 11 will proceed following the operation numbers. Note that the servers-to-be-monitored 100a and 100b are also subjected to the same processing procedures as with the server-to-be-monitored 100.

(S11) The message conversion unit 140 obtains message text from a log stored in the log storage unit 110. For example, a log has multiple message texts separated by predetermined code (e.g., line feed code). The message conversion unit 140 can distinguish and obtain individual message texts by this code.

(S12) The message conversion unit 140 converts the obtained message into a message number, based on the message dictionary 121 stored in the dictionary storage unit 120. The message conversion unit 140 outputs the information of the message number to the message transmission unit 150. For example, in the event of the message conversion unit 140 having obtained a message "2011/7/25 10:58:30 . . . HDD Fault", the information of the message number includes point-in-time "2011/7/25 10:58:30" and message number "3".

(S13) The message transmission unit 150 decides the upstream detection server to which to transmit the information of the message number obtained from the message conversion unit 140, based on the distribution table 131 stored in the distribution table storage unit 130.

(S14) The message transmission unit 150 transmits the message data 600 to the transmission destination upstream detection server decided in S13. For example, in the event that the message number is "3", the message data 600a is transmitted to the upstream detection server 200 (server number "1").

Accordingly, messages included in logs are converted in to message numbers. The message numbers are notified to the upstream detection servers 200 and 200a according to the message data. With the distribution table 131, one message number is correlated with one upstream detection server. Accordingly, message data relating to one message number is collected by one upstream detection server.

Note that the servers-to-be-monitored 100, 100a, and 100b execute this message notification processing when a new message has been added to the log. Alternatively, this may be executed at the timing of a predetermined cycle, or when a predetermined number of messages has been added to the log.

The upstream detection server 200 stores the message data received from the servers-to-be-monitored 100, 100a, and 100b in the storage unit 210. The upstream detection server 200a stores message data received from the servers-to-be-monitored 100, 100a, and 100b in its own storage unit.

Figure 12:
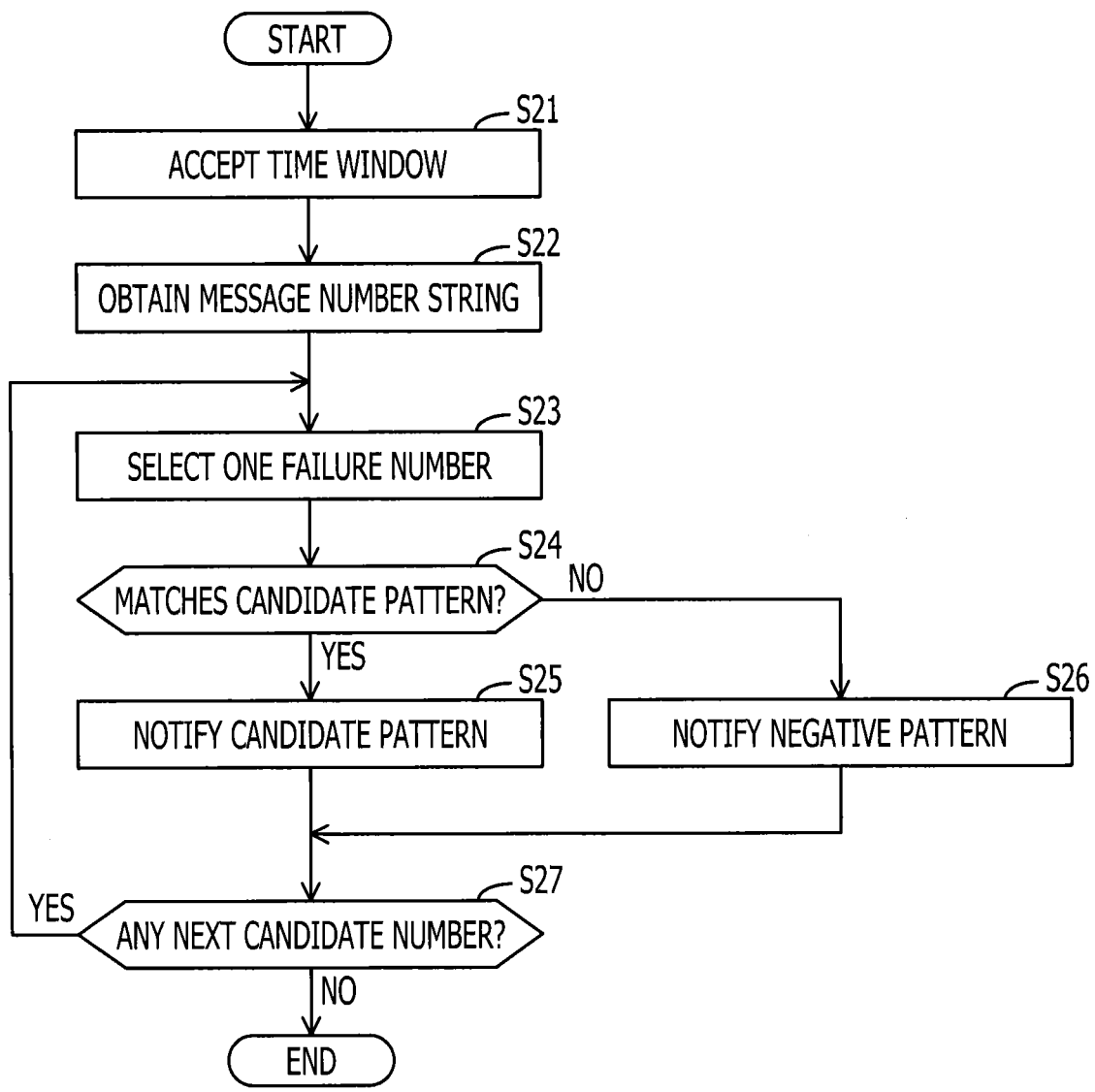
FIG. 12 is a flowchart illustrating an example of candidate pattern detection according to the second embodiment.

FIG. 12 is a flowchart illustrating an example of candidate pattern detection according to the second embodiment. The processing illustrated in FIG. 12 will be described below following operation numbers. The upstream detection server 200a is also subjected to the same processing procedures as with the upstream detection server 200.

(S21) The administrating terminal device 400 inputs a time window to the upstream detection server 200. A time window is information of time range. For example, a time window includes information of a time range of "2011/7/25 10:58:00" through "2011/7/25 10:59:00", for example. The same time window is input to the upstream detection servers 200 and 200a.

(S22) The candidate detection unit 220 references the message data stored in the storage unit 210 and references all message numbers included in the time window (i.e., obtains a message number string).

(S23) The candidate detection unit 220 references the candidate pattern table 211 stored in the storage unit 210, and selects one failure number.

(S24) The candidate detection unit 220 references the candidate pattern table 211 and determines whether the pattern of the message number string matches any candidate pattern corresponding to a branch number of the failure number (complete match). In the event that there is a match with a candidate pattern, the processing is advanced to S25. In the event that there is no match with any candidate pattern, the processing is advanced to S26. For example, the message number string "3, 5, 3, 5" is a combination of message numbers "3" and "5", so the pattern thereof is "3, 5". This pattern "3, 5" matches the candidate pattern "3, 5". In the same way, the pattern of message number string "5, 3, 7, 3, 7" is "3, 5, 7". This pattern "3, 5, 7" does not match the candidate pattern "3, 5". With the candidate pattern table 211, the candidate pattern of branch number "1-1" is "-", meaning nothing has been set. In the event that no message number is obtained in S22 regarding a candidate pattern with the branch number "1-1", determination is made that there is a match with the candidate pattern with the branch number "1-1". On the other hand, in the event that any message number has been obtained in S22, determination is made that there is no match with the candidate pattern with the branch number "1-1".

(S25) The candidate detection unit 220 generates candidate pattern notification data regarding the candidate pattern detected from the message number string, and transmits this to the downstream detection server 300. For example, in the event of having detected candidate pattern "3, 5" (branch number "1-2"), the candidate detection unit 220 transmits the candidate pattern notification data 700*a* to the downstream detection server 300. In the event that there is candidate pattern with another branch number, candidate pattern notification data is also generated for that candidate pattern as well and is transmitted to the downstream detection server 300. Now, in the event that no message number is obtained as with the branch number "1-1" illustrated in S24 for example, there may be cases where determination is made that there is a match with a candidate pattern. It should be noted that this is an exception, however, and the candidate detection unit 220 does not perform candidate pattern notification otherwise.

(S26) The candidate detection unit 220 generates negative pattern notification data regarding the failure number selected in S23, and transmits this to the downstream detection server 300. For example, the failure number "1" has branch numbers "1-1", "1-2", and "1-3". In the event that no candidate patterns of these branch numbers for the failure number "1" are detected from the message number string, the candidate detection unit 220 generates candidate pattern notification data 700*c* in which is set the negative pattern for failure number "1", which is "−1", and transmits this to the downstream detection server 300.

(S27) The candidate detection unit 220 takes the failure number selected in S23 has having been processed. The candidate detection unit 220 references the candidate pattern table 211 and determines whether or not there is a next failure number (unprocessed failure number). In the event that there is a next failure number, the flow is advanced to S23. In the event that there is no next failure number, the processing is ended.

Thus, candidate patterns are detected at the upstream detection server 200, and candidate pattern notification data is transmitted to the downstream detection server 300. This also holds true for the upstream detection server 200*a*. the downstream detection server 300 stores in the storage unit 310 the candidate pattern notification data received from the upstream detection servers 200 and 200*a*.

Note that an arrangement may be made wherein, in the event that no message number has been obtained, an explicit notification to that effect is made to the downstream detection server 300 (e.g., with candidate pattern "1:1-1"). On the other hand, with the arrangement described above where notification of candidate pattern is not performed, the amount of communication data exchanged between the upstream detection servers 200 and 200*a*, and the downstream detection server 300 can be reduced, thereby alleviating the load on the network between these servers.

Figure 13:
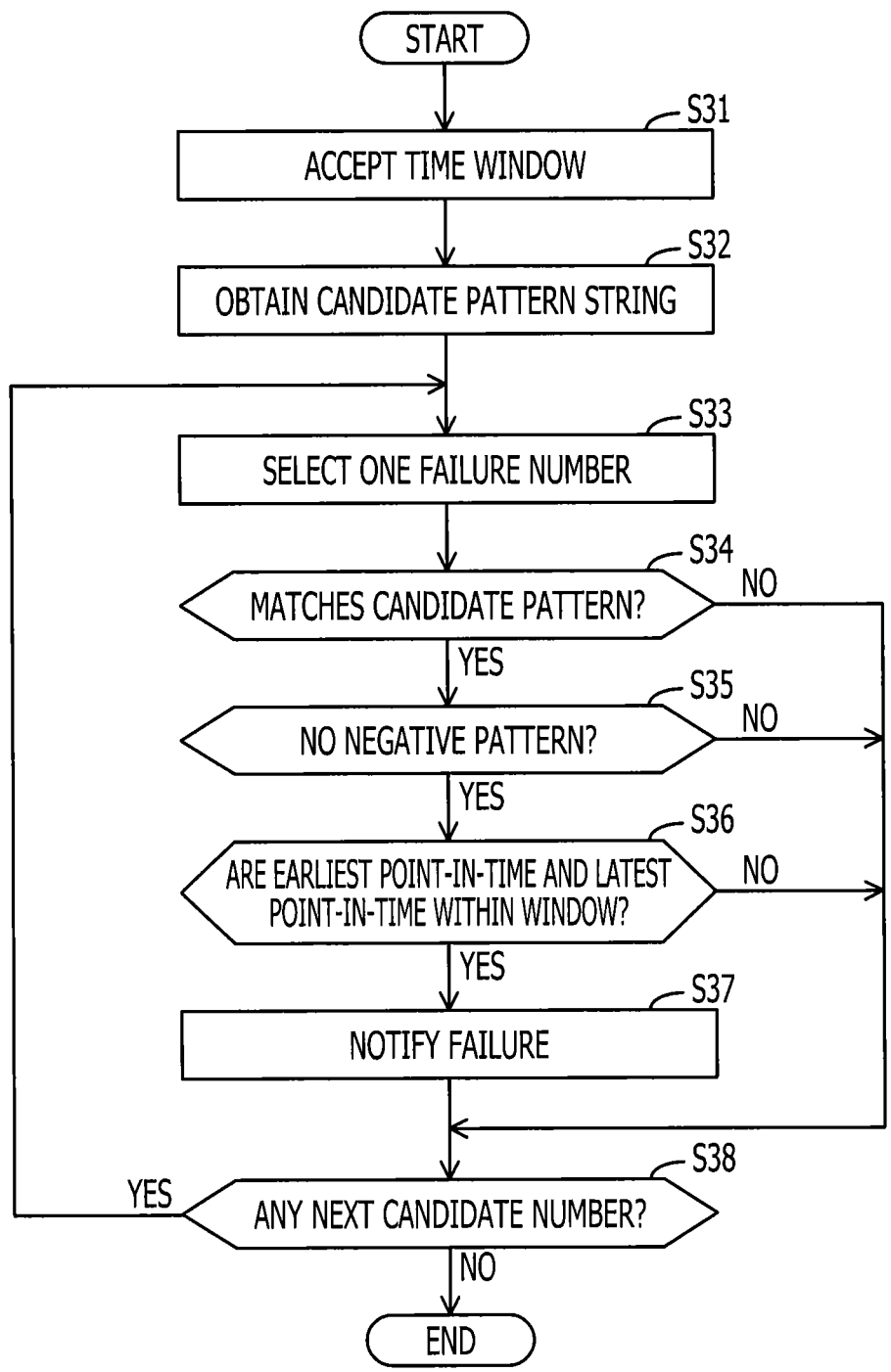
FIG. 13 is a flowchart illustrating an example of failure detection according to the second embodiment.

FIG. 13 is a flowchart illustrating an example of failure detection according to the second embodiment. The processing illustrated in FIG. 13 will be described below following the operation numbers.

(S31) The administrating terminal device 400 inputs a time window to the downstream detection server 300. The candidate compositing unit 320 accepts input of the time window. The time range of the time window to be input to the downstream detection server 300 is the same range as the time window input to the upstream detection servers 200 and 200*a*. At the same time as input of the time window to the upstream detection servers 200 and 200*a*, the administrating terminal device 400 may input the time window to the downstream detection server 300. In this case, the subsequent S32 is started after receiving the full set of candidate pattern notification data transmitted from the upstream detection servers 200 and 200*a*.

(S32) The candidate compositing unit 320 references candidate pattern notification data stored in the storage unit 310, and obtains all candidate patterns (candidate pattern string) regarding which the end point-in-time is set within the time window.

(S33) The candidate compositing unit 320 references the composite pattern table 311 stored in the storage unit 310, and selects one failure number.

(S34) The candidate compositing unit 320 references the composite pattern table 311 and determines whether or not the candidate pattern string matches with any composite pattern corresponding to the branch numbers of the failure number. In the event that there is a match with any composite pattern, the processing is advanced to S35. In the event that there is no match with any composite pattern, the processing is advanced to S38.

(S35) The candidate compositing unit 320 references the candidate pattern notification data stored in the storage unit 310, and determines whether or not there is a negative pattern of the failure number. In the event that there is no negative pattern of the failure number, the processing is advanced to S36. In the event that there is a negative pattern, the processing is advanced to S38. For example, according to the composite pattern table 311, the composite pattern of branch number "1-1" is "2:1-1". In this case, in the event that the candidate pattern "2:1-1" is included in the candidate pattern string, in S34 the composite pattern of branch number "1-1" is detected. In the event that there is a negative pattern of failure number "1" in this S35, failure detection of failure number "1" is suppressed even if this composite pattern has been detected. Thus, whether or not the candidate pattern "2:1-1" holds can be determined by whether or not there is a negative pattern.

(S36) The candidate compositing unit 320 references the candidate pattern notification data stored in the storage unit 310, and extracts the start point-in-time and end point-in-time corresponding to the candidate pattern serving as an element of the detected composite pattern. The candidate compositing unit 320 determines whether or not the earliest point-in-time and the latest point-in-time in the extracted points-in-time are both included in the time window. In the event that these are included, the flow is advanced to S37, and otherwise, the flow is advanced to S38.

(S37) The candidate compositing unit 320 notifies the administrating terminal device 400 of the failure contents corresponding to the failure number selected in S33. The method of notification of failure is not restricted to notification to the administrating terminal device 400. For example, an arrangement may be made where the candidate compositing unit 320 holds an email address of the administrator, and sends an email describing the failure contents to this email address.

(S38) The candidate compositing unit 320 takes the failure number selected in S33 to have been processed. The candidate compositing unit 320 references the composite pattern table 311 and determines whether or not there is a next failure number (unprocessed failure number). In the event that there is a next failure number, the processing is advanced to S33. In the event that there is no next failure number, the processing ends.

Thus, a composite pattern is detected at the downstream detection server 300, and failure corresponding to this composite pattern is notified to the administrating terminal device 400.

The administrator can easily specify a predetermined time range with a time window, so as to perform failure detection processing.

According to the processing in S36, even if a composite pattern which does not fit into the time window is detected in S34, failure according to this composite pattern can be made to be undetected. For example, there may be cases where, when performing continuous failure detection while shifting the time window toward the future, candidate pattern notification data of a point-in-time older than the time window specified this time (from the previous time) remains in the storage unit 310 (duplicate data is overwritten). In this case, there is the possibility that a composite pattern which does not fit into the time window specified this time will be detected. Accordingly, this composite pattern is removed in S36. Note that an arrangement may be made where candidate pattern notification data stored in the storage unit 310 is cleared before performing failure detection processing.

Further, in the S31 above, the time range of the time window to be input to the downstream detection server 300 may be a different range which at least partially overlaps the time window input to the upstream detection servers 200 and 200a.

In the S32 above, the candidate compositing unit 320 may reference the candidate pattern notification data stored in the storage unit 310 and obtain all candidate patterns of which the start point-in-time and the end point-in-time are both within the time window (candidate patterns string). In this case, S36 may be skipped and advanced to S37.

The administrating terminal device 400 generates an image indicating the failure contents, for example, so as to be displayed on the monitor of the administrating terminal device 400 and presented to the administrator.

Next, a specific example of failure detection based on the above-described processing procedures will be described.

Figure 14:
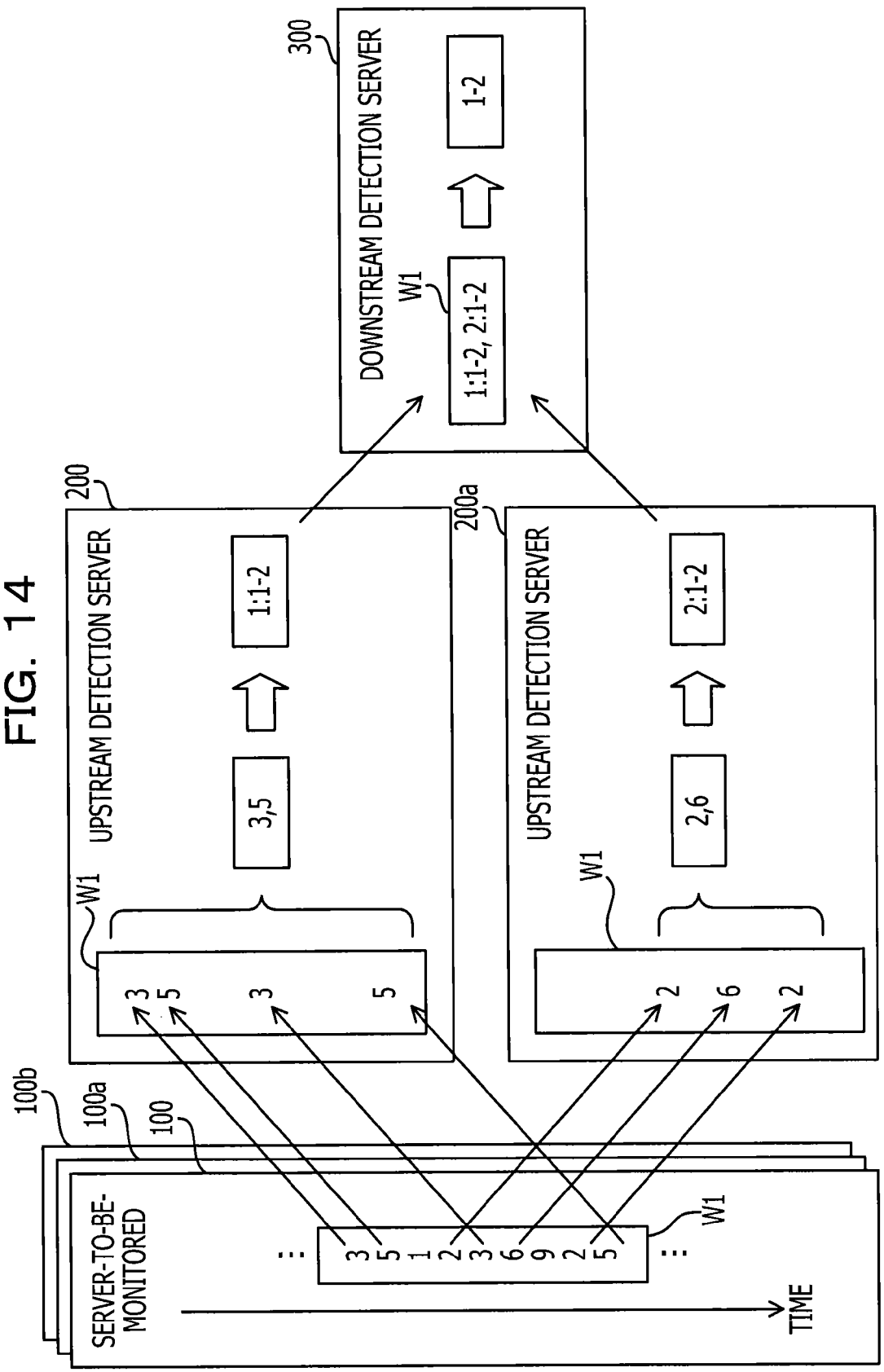
FIG. 14 is a diagram illustrating a first example of failure detection according to the second embodiment.

FIG. 14 is a diagram illustrating a first example of failure detection according to the second embodiment. In FIG. 14, an example of a case where the composite pattern of branch number "1-2" is detected, thereby detecting failure of failure number "1", is illustrated.

Upon messages being recorded in a log, the servers-to-be-monitored 100, 100a, and 100b transmit message data corresponding to the messages to one of the upstream detection servers 200 and 200a, based on the distribution table 131. For example, let us say that the message numbers corresponding to messages are " . . . , 3, 5, 1, 2, 3, 6, 9, 2, 5, . . . ". According to the distribution table 131, the servers-to-be-monitored 100, 100a, and 100b notify the upstream detection server 200 of message numbers "3" and "5", and similarly notify the upstream detection server 200a of message numbers "2" and "6".

The upstream detection servers 200 and 200a held and store the message numbers notified by way of message data, and the point-in-time at which the messages were generated.

The administrating terminal device 400 inputs a time window W1 to the upstream detection servers 200 and 200a, and downstream detection server 300. Included in the time range of the time window W1 are the message numbers of "3, 5, 1, 2, 3, 6, 9, 2, 5" notified from the servers-to-be-monitored 100, 100a, and 100b.

At the upstream detection server 200, "3, 5, 3, 5" in early order are obtained from the stored message data, as a message number string within the time window W1. Based on the candidate pattern table 211, the upstream detection server 200 detects the candidate pattern "3, 5" from the message number string. The upstream detection server 200 generates candidate pattern notification data including the server number "1" and branch number "1-2" corresponding to this candidate pattern, and transmits this to the downstream detection server 300. The start point-in-time to be set to the candidate pattern notification data is the point-in-time corresponding to the "3" detected the earliest in the message number string. The end point-in-time is the point-in-time corresponding to the "5" detected the last in the message number string. The candidate pattern notified by the upstream detection server 200 is written as "1:1-2".

At the upstream detection server 200a, "2, 6, 2" in early order are obtained from the stored message data, as a message number string within the time window W1. Based on the candidate pattern table 211, the upstream detection server 200a detects the candidate pattern "2, 6" from the message number string. The upstream detection server 200a generates candidate pattern notification data including the server number "2" and branch number "1-2" corresponding to this candidate pattern, and transmits this to the downstream detection server 300. The start point-in-time to be set to the candidate pattern notification data is the point-in-time corresponding to the "2" detected the earliest in the message number string. The end point-in-time is the point-in-time corresponding to the "2" detected the last in the message number string. The candidate pattern notified by the upstream detection server 200 is written as "2:1-2".

The downstream detection server 300 holds and stores the server numbers, start point-in-time, and end point-in-time, notified by the candidate pattern notification data.

The downstream detection server 300 obtains the candidate pattern string "1:1-2, 2:1-2" within the time window W1, from the stored candidate pattern notification data. The downstream detection server 300 then detects the composite pattern of brand number "1-2" based on the distribution table 131.

Now, the start point-in-time and end point-in-time of the candidate pattern "1:1-2" is included in the time window W1. The start point-in-time and end point-in-time of the candidate pattern "2:1-2" is included in the time window W1. Accordingly, the downstream detection server 300 notifies the administrating terminal device 400 of the contents of the failure corresponding to the failure number "1".

Figure 15:
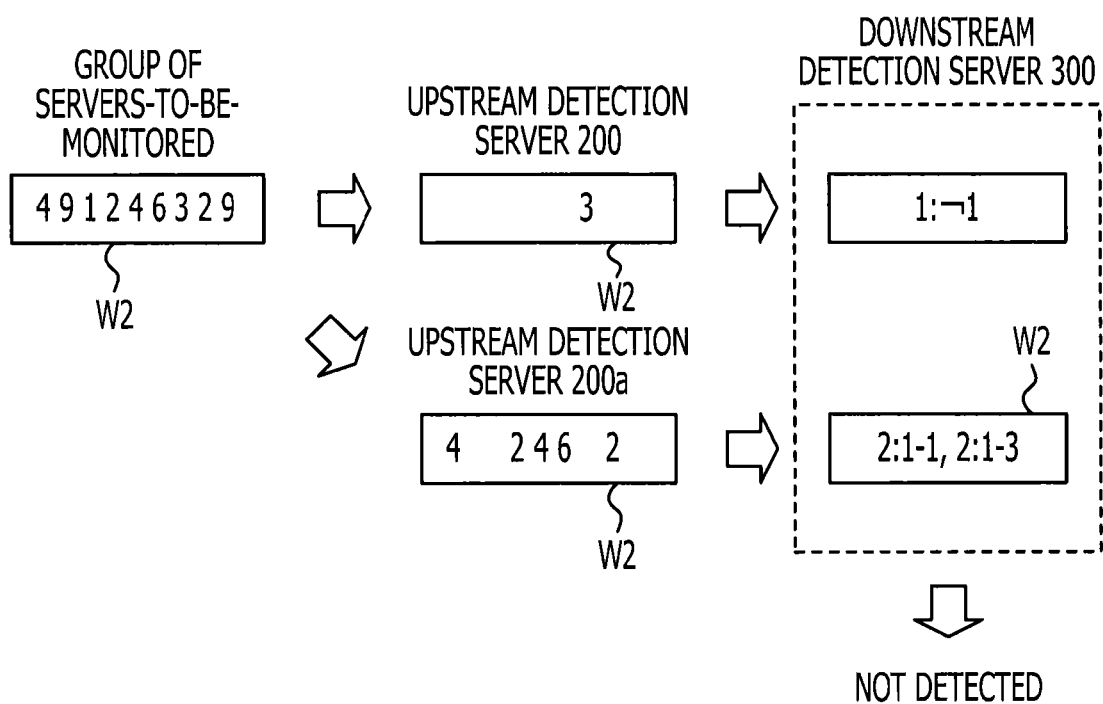
FIG. 15 is a diagram illustrating a second example of failure detection according to the second embodiment.

FIG. 15 is a diagram illustrating a second example of failure detection according to the second embodiment. In FIG. 15, a case is illustrated where failure of failure number "1" is not detected. The servers-to-be-monitored 100, 100a, and 100b (group of servers-to-be-monitored) notify, in time-sequence, message numbers "4, 9, 1, 2, 4, 6, 3, 2, 9", to one of the upstream detection servers 200 and 200a. According to the distribution table 131, the message number "3" is notified to the upstream detection server 200. The message numbers "2", "4", and "6", are notified to the upstream detection server 200a.

The administrating terminal device 400 inputs a time window W2 to the upstream detection servers 200 and 200a, and downstream detection server 300. We will say that the time corresponding to the message numbers "4, 9, 1, 2, 4, 6, 3, 2, 9" is included in the time window W2.

At the upstream detection server 200, the message number string "3" within the time window W2 is obtained. According to the candidate pattern table 211, the pattern "3" obtained from this message number string does not fall under any branch number candidate pattern of the failure number "1".

Accordingly, the upstream detection server 200 notifies the negative pattern "1:–1" of the failure number "1" to the downstream detection server 300.

At the upstream detection server 200*a*, the message number string "4, 2, 4, 6, 2" within the time window W2 is obtained. According to the candidate pattern table 211*a*, the pattern "2, 4, 6" obtained from this message number string falls under the candidate pattern of branch numbers "1-1" and "1-3". Accordingly, the upstream detection server 200*a* notifies the downstream detection server 300 of detection of the candidate patterns "2:1-1" and "2:1-3". Note that the candidate pattern "2, 6" of the branch number "1-2" differs from the pattern "2, 4, 6" obtained from this message number string, and accordingly is not detected. The start point-in-time and end point-in-time of the candidate patterns "2:1-1" and "2:1-3" are each included in the time window W2.

The downstream detection server 300 has received the negative pattern "1:–1" from the upstream detection server 200. The downstream detection server 300 has received the candidate patterns "2:1-1" and "2:1-3" from the upstream detection server 200*a*. In this case, the downstream detection server 300 does not detect the failure of the failure number "1" due to the negative pattern "1:–1".

Figure 16:
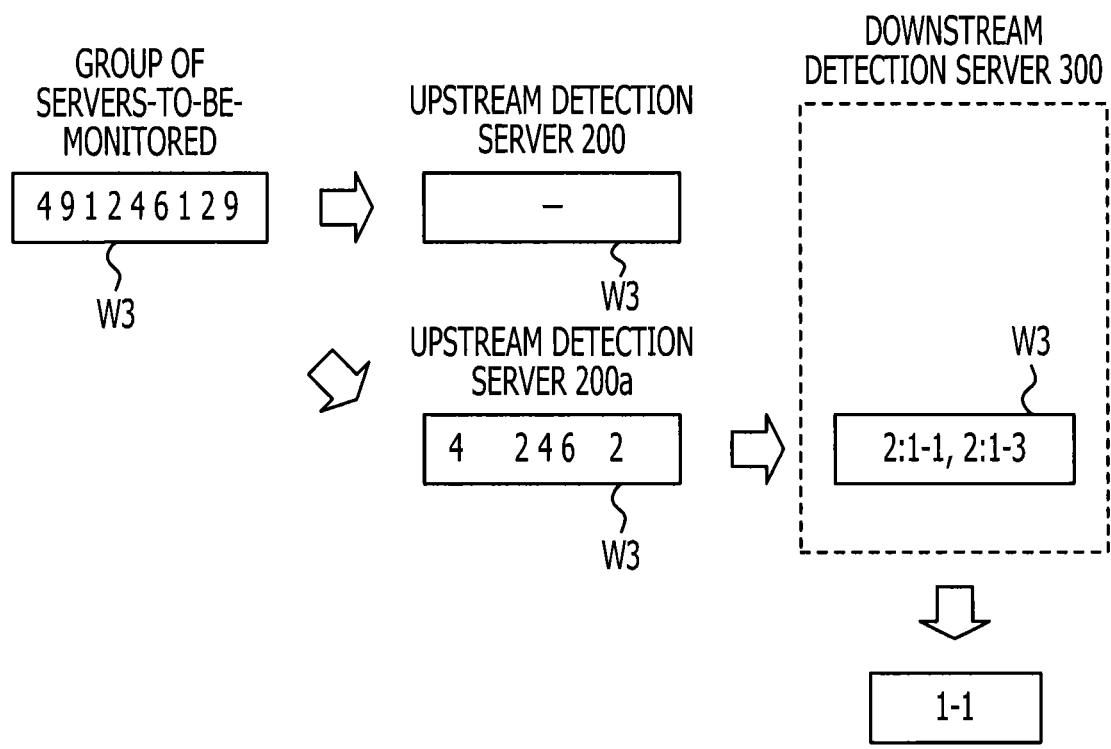
FIG. 16 is a diagram illustrating a third example of failure detection according to the second embodiment.

FIG. 16 is a diagram illustrating a third example of failure detection according to the second embodiment. In FIG. 16, a case is illustrated where failure of failure number "1" is detected, by detecting a composite pattern of branch number "1-1". The servers-to-be-monitored 100, 100*a*, and 100*b* (group of servers-to-be-monitored) notify message numbers "4, 9, 1, 2, 4, 6, 1, 2, 9", to one of the upstream detection servers 200 and 200*a*. According to the distribution table 131, there is no message number to be notified to the upstream detection server 200. the message numbers "2", "4", and "6", are notified to the upstream detection server 200*a*.

The administrating terminal device 400 inputs a time window W3 to the upstream detection servers 200 and 200*a*, and downstream detection server 300. We will say that the time corresponding to the message numbers "4, 9, 1, 2, 4, 6, 1, 2, 9" is included in the time window W3.

At the upstream detection server 200, no message number string within the time window W3 is obtained. In this case, the upstream detection server 200 does nothing.

At the upstream detection server 200*a*, the message number string "4, 2, 4, 6, 2" within the time window W3 is obtained. According to the candidate pattern table 211*a*, the pattern "2, 4, 6" obtained from this message number string falls under the candidate pattern of branch numbers "1-1" and "1-3". Accordingly, the upstream detection server 200*a* notifies the downstream detection server 300 of detection of the candidate patterns "2:1-1" and "2:1-3". The start point-in-time and end point-in-time of the candidate patterns "2:1-1" and "2:1-3" are each included in the time window W3.

The downstream detection server 300 has received nothing from the upstream detection server 200. The downstream detection server 300 has received the candidate patterns "2:1-1" and "2:1-3" from the upstream detection server 200*a*. According to the composite pattern table 311, the composite pattern of the branch number "1-1" is "2:1-1". Accordingly, the downstream detection server 300 detects the composite pattern of this branch number "1-1". On the other hand, according to the composite pattern table 311, the composite pattern of the branch number "1-3" is "1:1-3, 2:1-3". However, the downstream detection server 300 has not received the candidate pattern "1:1-3". Accordingly, the downstream detection server 300 does not detect the composite pattern of the branch number "1-3".

The downstream detection server 300 has detected the composite pattern of the branch number "1-1", and accordingly notifies the administrating terminal device 400 of the contents of the failure corresponding to the failure number "1".

Thus, with the information processing system according to the second embodiment, part of message data output by the servers-to-be-monitored 100, 100*a*, and 100*b* is collected by the upstream detection server 200. On the other hand, another part of message data output by the servers-to-be-monitored 100, 100*a*, and 100*b* is collected by the upstream detection server 200*a*. The upstream detection servers 200 and 200*a* then each detect candidate patterns which can serve as failure causes, and notify the downstream detection server 300 thereof. The downstream detection server 300 detects failure based on the combination of candidate patterns (composite pattern).

Accordingly, with the information processing system according to the second embodiment, collecting message data of the same type at one upstream detection server suffices. This is because failure detection can be performed by combining the detection results at the upstream detection servers 200 and 200*a* downstream.

Further, there are cases where adding new failure cause patterns and changing existing patterns is desired in accordance with system operations. The information processing system according to the second embodiment also has the advantage that the table updating work in this case takes less labor.

FIGS. 17A and 17B are diagrams illustrating an example of updating tables with the second embodiment. FIGS. 17A and 17B illustrate a table which does not have to be updated at the time of adding a failure cause pattern, and a table which is to be updated. We will say that the new failure cause pattern is branch number "2-2" of the failure number "2". The branch number "2-2" corresponds to the failure cause pattern "2, 5, 8". In FIGS. 17A and 17B and thereafter, the term "message" may be abbreviated to "msg".

FIG. 17A illustrates a table which does not have to be updated. FIG. 17A illustrates the distribution table 131. The distribution tables held by the servers-to-be-monitored 100*a* and 100*b* also do not have to be updated, either.

FIG. 17B illustrates tables to be updated. With FIG. 17B, candidate pattern tables 211 and 211*a*, and composite pattern table 311 are illustrated.

The candidate pattern table 211 has added thereto "5" in related message (additional portion R1), "2-2" to branch number (additional portion R2), and "5" to candidate pattern corresponding to the branch number (additional portion R3).

The candidate pattern table 211*a* has added thereto "2-2" to branch number (additional portion R4), and "2, 8" to candidate pattern corresponding to the branch number (additional portion R5).

The candidate pattern table 311 has added thereto "2-2" to branch number (additional portion R6), and "1:2-2, 2:2-2" to composite pattern corresponding to the branch number(additional portion R7).

Thus, the tables to be updated are tables held by the upstream detection servers 200 and 200*a*, and downstream detection server 300, and the candidate pattern tables held by the servers-to-be-monitored 100, 100*a*, and 100*b* do not have to be updated.

As the system scale increases, the number of servers-to-be-monitored may increase. At this time, individually updating candidate pattern tables of the servers-to-be-monitored may increase the work costs thereof.

In contrast with this, with the information processing system according to the second embodiment, at the time of adding/changing failure cause patterns, updating work of candidate pattern tables of the servers-to-be-monitored 100, 100a, and 100b can be avoided. Accordingly, work costs for updating failure cause patterns can be alleviated.

Next, another failure detection method will be exemplified and compared with the failure detection method according to the second embodiment.

Figure 18:
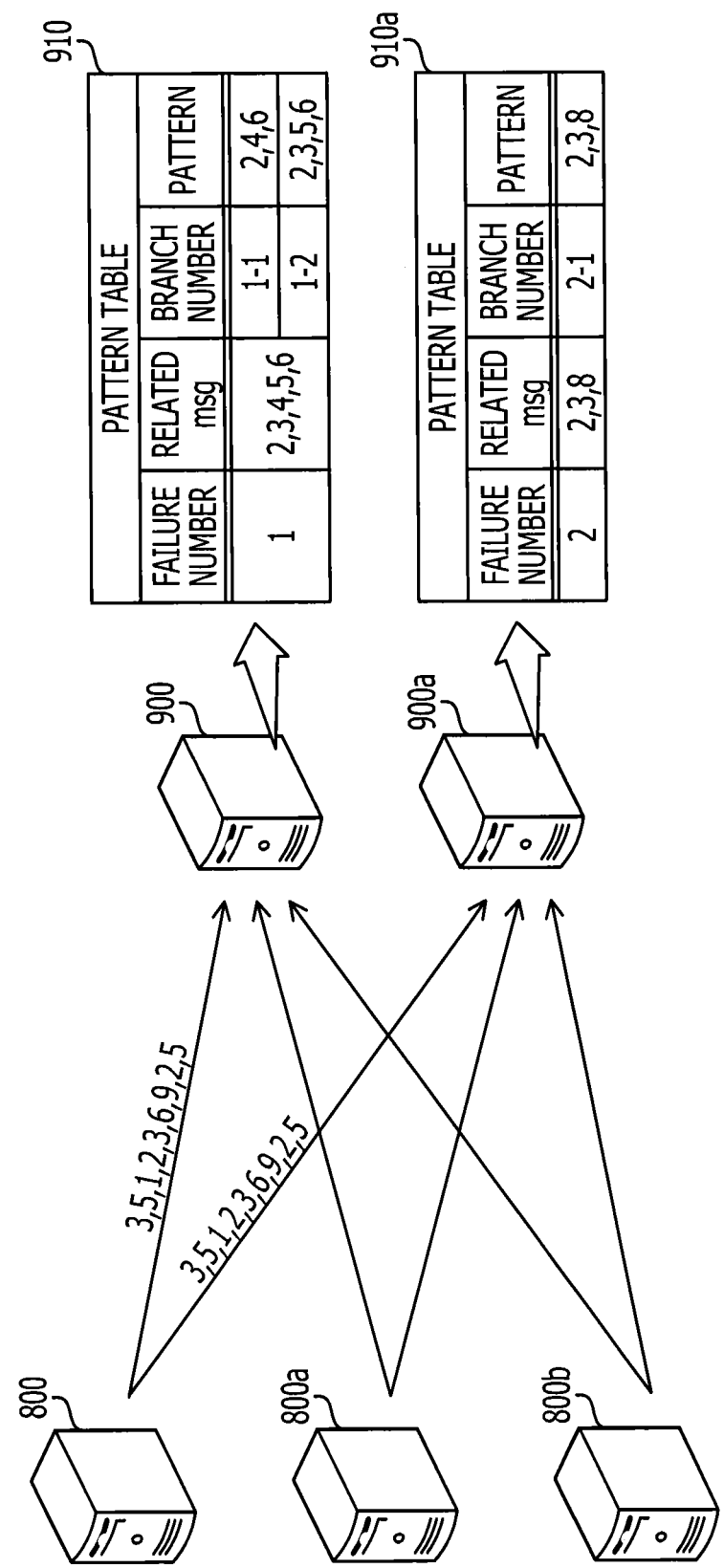
FIG. 18 is a diagram illustrating a first other example of message distribution.

FIG. 18 is a diagram illustrating a first other example of message distribution. The information processing system in FIG. 18 includes servers-to-be-monitored 800, 800a, and 800b, and failure detection servers 900 and 900a. The servers-to-be-monitored 800, 800a, and 800b are server computers monitored by the failure detection servers 900 and 900a.

The failure detection servers 900 and 900a are server computer which detect failures at the servers-to-be-monitored 800, 800a, and 800b. The failure detection servers 900 and 900a are individually assigned failures to detect.

The failure detection server 900 handles failure detection of failure number "1". The failure detection server 900 holds a pattern table 910. The pattern table 910 has registered therein patterns of message numbers for detecting failure number "1".

The failure detection server 900a handles failure detection of failure number "2". The failure detection server 900a holds a pattern table 910a. The pattern table 910a has registered therein patterns of message numbers for detecting failure number "2".

With the information processing system according to FIG. 18, both of failure detection servers 900 and 900a collect all message data output from the servers-to-be-monitored 800, 800a, and 800b, to detect failures which each handles. In this case, for example, the server-to-be-monitored 800 duplicates a series of message data for notification of message numbers "3, 5, 1, 2, 3, 6, 9, 2, 5" and transmits this to both of the failure detection servers 900 and 900a. This is also true for the servers-to-be-monitored 800a and 800b. Since the same message data is duplicated and transmitted, there is concern that the network load will increase. This arrangement is inefficient.

On the other hand, with the information processing system according to the second embodiment, such duplication of notification data, or duplicate transmission of notification data, does not have to be performed. Accordingly, increase in the load on the network can be suppressed as compared with the information processing system in FIG. 18. For example, in a case of the server-to-be-monitored 800 intending to notify nine message numbers, notification is performed to the two failure detection servers 900 and 900a, so a total of 9×2=18 data transmissions are carried out. In comparison with this, with the information processing system according to the second embodiment, transmitting each of the nine message numbers to one of the upstream detection servers 200 and 200a is sufficient, so only nine data transmissions have to be performed.

Figure 19:
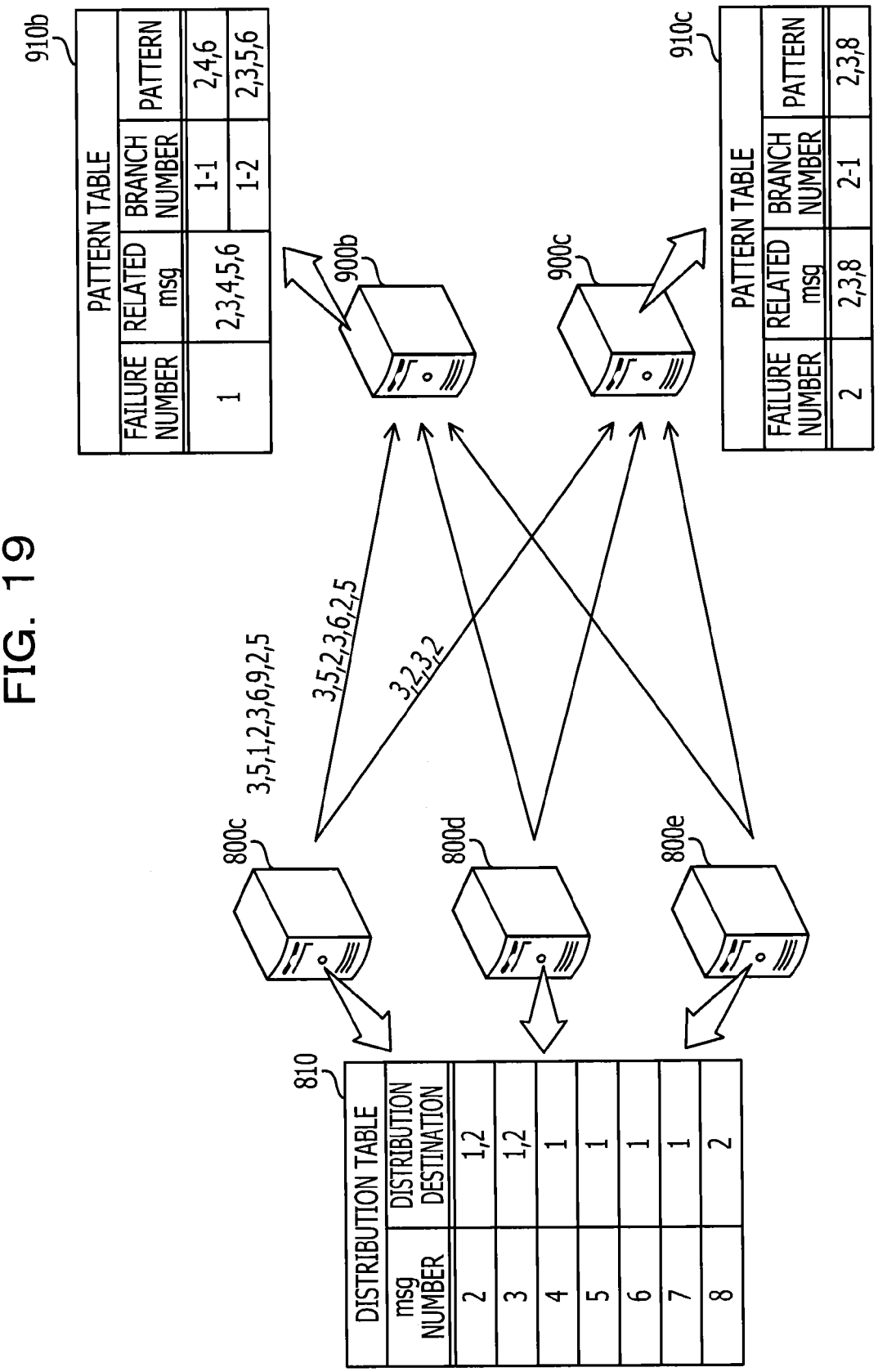
FIG. 19 is a diagram illustrating a second other example of message distribution.

FIG. 19 is a diagram illustrating a second other example of message distribution. The information processing system in FIG. 19 includes servers-to-be-monitored 800c, 800d, and 800e, and failure detection servers 900b and 900c. The servers-to-be-monitored 800c, 800d, and 800e are server computers monitored by the failure detection servers 900b and 900c.

The failure detection servers 900b and 900c are server computers which detect failures at the servers-to-be-monitored 800c, 800d, and 800e. The failure detection servers 900b and 900c are individually assigned failures to detect.

The failure detection server 900b handles failure detection of failure number "1". The failure detection server 900b holds a pattern table 910b. The pattern table 910b has registered therein patterns of message numbers for detecting failure number "1".

The failure detection server 900c handles failure detection of failure number "2". The failure detection server 900c holds a pattern table 910c. The pattern table 910c has registered therein patterns of message numbers for detecting failure number "2".

With the information processing system in FIG. 19, the failure detection servers 900b and 900c collect only message numbers included in patterns which each handles from the servers-to-be-monitored 800c, 800d, and 800e. Accordingly, the servers-to-be-monitored 800c, 800d, and 800e hold a distribution table 810. The distribution table 810 has defined therein a failure detection server (Server number) which is a distribution target, in correlation with the message number. For example, server number "1" is failure detection server 900b, and server number "2" is failure detection server 900c.

In this case, the number of notification data transmission and the amount of data is reduced as compared with the information processing system in FIG. 18. This is because message numbers not used for pattern detection at the failure detection servers 900b and 900c are not transmitted.

However, in the event that both failure detection servers 900b and 900c detect a pattern including message number "2", server numbers "1" and "2" are registered for the distribution destinations of the message number "2". For example, let us say that the server-to-be-monitored 800c notifies the message numbers of "3, 5, 1, 2, 3, 6, 9, 2, 5". At this time, the failure detection server 900b collects the message numbers "2, 3, 4, 5, 6", and the failure detection server 900c collects the message numbers "2, 3, 8". Accordingly, the server-to-be-monitored 800c ends up duplicating the notification data of message numbers "2" and "3" and transmitting in duplicate to the failure detection servers 900b and 900c.

On the other hand, with the information processing system according to the second embodiment, such duplication of notification data, or duplicate transmission of notification data, does not have to be performed. Accordingly, increase in the load on the network can be suppressed as compared with the information processing system in FIG. 19 as well.

Further, with the information processing system in FIG. 19, updating work of the distribution tables 810 held by the servers-to-be-monitored 800c, 800d, and 800e occurs when adding new patterns or changing patterns for the failure detection servers 900b and 900c. The greater the number of servers, the greater the amount of work may be.

In contrast with this, with the information processing system according to the second embodiment, at the time of adding/changing failure cause patterns, updating distribution tables does not have to be performed. Accordingly, work costs for updating failure cause patterns can be alleviated. Thus, according to the information processing system according to the second embodiment, distribution processing of failure pattern detection can be performed efficiently.

Next, a third embodiment will be described. Description will be made primarily with regard to differences as to the above-described second embodiment, and description of points held in common will be omitted.

While description has been made with the second embodiment regarding an arrangement where one server number is correlated with one message number in a distribution table 131, in order to collect the same message number with one upstream detection server. On the other hand, the transmission destination of message data may be decided without using the distribution table 131. The third embodiment provides functions to that end.

Here, with the third embodiment, the processing of message distribution differs as compared to the second embodiment. Other system and device configurations are the same as with the second embodiment, so the components will be referred to using the same names and reference numerals.

Figure 20:
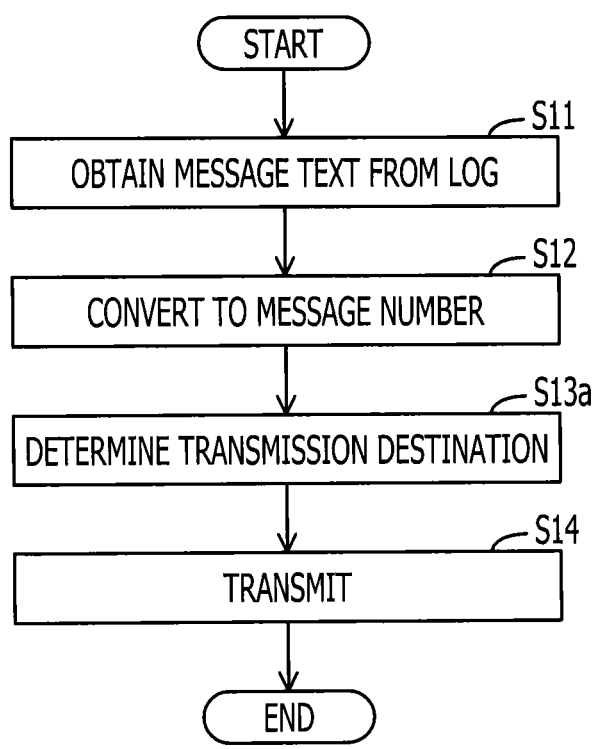
FIG. 20 is a flowchart illustrating an example of message distribution according to a third embodiment.

FIG. 20 is a flowchart illustrating an example of message distribution with a third embodiment. The processing illustrated in FIG. 20 will now be described following operation numbers. Note however, that the processing in S11, S12, and S14 is the same as the processing of S11, S12, and S14 in FIG. 11, so description thereof will be omitted.

(S13*a*) The message transmission unit 150 obtains the remainder of having divided a message number obtained by message text conversion by 2. The upstream detection server of the server number decided based on the obtained remainder is then decided to be the transmission destination of the message data. For example, the upstream detection server 200 if the remainder is an odd number, and the upstream detection server 200*a* if the remainder is an even number.

Thus, the message transmission unit 150 can decode the transmission destination of message data even without using the distribution table 131. Accordingly, the trouble of providing the upstream detection servers 200 and 200*a* with distribution tables 131 can also be done away with. It is sufficient to allocate candidate pattern which the upstream detection servers 200 and 200*a* handle detection of in accordance with message numbers collected at the upstream detection servers 200 and 200*a*.

For example, in the event that there exist M upstream detection servers (where M is an integer 2 or greater), the remainder of dividing the message number by M is obtained. In this case, an arrangement can be conceived where the upstream detection server which has a server number equal to the obtained remainder is decided to be the notification destination (in this case, server numbers "0" through "M−1" are assigned to the upstream detection servers beforehand).

Next, a fourth embodiment will be described. Description will be made primarily with regard to differences as to the above-described second and third embodiments, and description of points held in common will be omitted.

Now, the servers-to-be-monitored 100, 100*a*, and 100*b* may differ in frequency of appearance, depending on message types. This may result in message data with a high frequency of appearance being transmitted to a certain upstream detection server with a disproportionately high frequency, which may lead to an increased load on that upstream detection server. Accordingly, with the fourth embodiment, a function is provided wherein disproportionate data collection is equalized, and load of the upstream detection servers is distributed.

The information processing system according to the fourth embodiment is the same as with the information processing system according to the second embodiment, described with reference to FIG. 2. The information processing system according to the fourth embodiment differs from the information processing system according to the second embodiment in that a distribution table compilation server 500 is provided. The distribution table compilation server 500 is coupled to the network 10. A hardware example of the distribution table compilation server 500 is the same as the hardware example of the upstream detection server 200 described with FIG. 3. Other devices and the like will be referred to using the same names and reference numerals as with the second embodiment.

Figure 21:
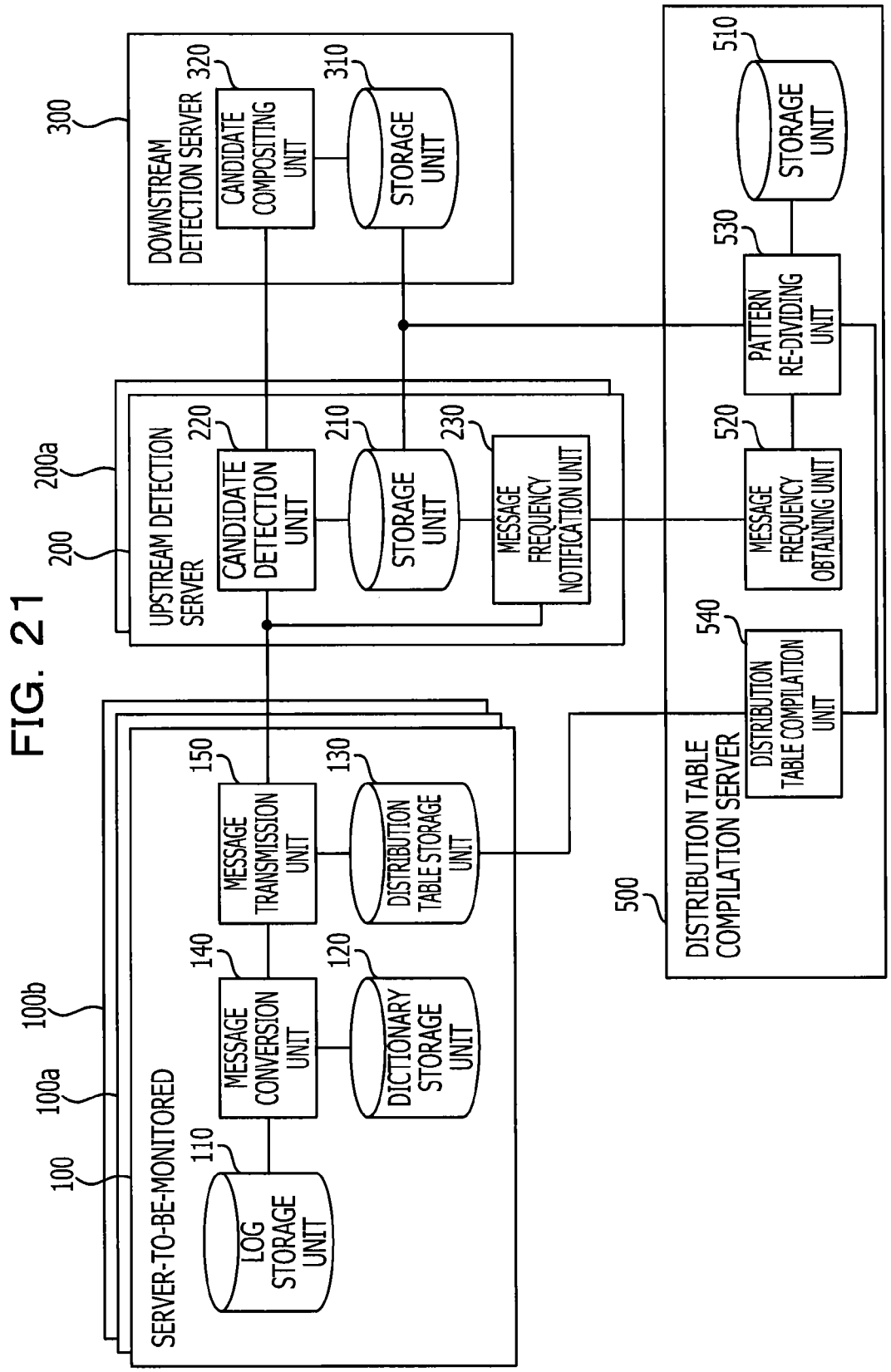
FIG. 21 is a diagram illustrating an example of software according to a fourth embodiment.

FIG. 21 is a diagram illustrating an example of software with the fourth embodiment. Part of all of the units illustrated in FIG. 21 may be program modules executed by the servers-to-be-monitored 100, 100*a*, and 100*b*, upstream detection servers 200 and 200*a*, downstream detection server 300, and distribution table compilation server 500. Also, part or all of the units illustrated in FIG. 21 may be electronic circuits such as an FPGA or ASIC or the like. The servers-to-be-monitored 100*a* and 100*b* may also be realized using similar hardware as with the server-to-be-monitored 100. Further, the upstream detection server 200*a* may also be realized using similar hardware as with the upstream detection server 200.

Now, the example of the software of the server-to-be-monitored 100 and downstream detection server 300 is the same as with that described with FIG. 4.

The upstream detection server 200 has a storage unit 210, candidate detection unit 220, and message frequency notification unit 230. The storage unit 210 and candidate detection unit 220 are the same as with that described with FIG. 4.

The message frequency notification unit 230 obtains frequency of appearance for each message number, based on the message data received from the servers-to-be-monitored 100, 100*a*, and 100*b*. The message frequency notification unit 230 stores the results thereof in the storage unit 210. The message frequency notification unit 230 transmits the obtained frequency of appearance information to the distribution table compilation server 500 periodically.

The distribution table compilation server 500 has a storage unit 510, a message frequency obtaining unit 520, a pattern re-dividing unit 530, and a distribution table compilation unit 540.

The storage unit 510 stores a pre-division pattern table. A pre-division pattern table is a table in which is registered failure contents as to combinations of message numbers. Hereinafter, a combination of message numbers registered in a pre-division pattern table may be referred to as a "pre-division pattern".

The message frequency obtaining unit 520 periodically receives frequency of appearance information for each message number from the upstream detection servers 200 and 200*a*. The message frequency obtaining unit 520 outputs this frequency of appearance information to the pattern re-dividing unit 530.

The pattern re-dividing unit 530 tabulates the frequency of appearance for each message number. Based on the tabulation results, the pattern re-dividing unit 530 assigns message numbers to the upstream detection servers 200 and 200*a*, such that the frequency of appearance of the message numbers handled by both servers is as equal as possible. The pattern re-dividing unit 530 generates candidate patterns and composite patterns based on assignation results. The pattern re-dividing unit 530 transmits the generated candidate patterns to the upstream detection servers 200 and 200*a*, so as to update the candidate pattern tables 211 and 211*a*. The pattern re-dividing unit 530 transmits the generated composite patterns to the downstream detection server 300, and updates the composite pattern table 311. The pattern re-dividing unit 530 notifies the distribution table compilation unit 540 of the assignation results of message numbers to the upstream detection servers 200 and 200*a*.

The distribution table compilation unit 540 compiles a distribution table based on the assignation results of message numbers by the pattern re-dividing unit 530. The distribution table compilation unit 540 transmits the compiled distribution table to the servers-to-be-monitored 100, 100*a*, and 100*b*, and the servers-to-be-monitored 100, 100*a*, and 100*b* update their respective distribution tables.

FIG. 22 is a diagram illustrating an example of a pre-division pattern table. The pre-division pattern table 511 is stored in the storage unit 510. The pre-division pattern table 511 includes the items of failure number, branch number, pre-division pattern, and failure contents.

Failure numbers are registered under the item of failure number. Branch numbers are registered under the item of branch number. Pre-division patterns are registered under the item of pre-division pattern. Contents of system failures are registered under the item of failure contents.

For example, a pre-division pattern is "2, 4, 6" for branch number "1-1" of failure number "1", and the failure content is "Web service ABC unavailable". This means that the failure content "Web service ABC unavailable" has been correlated to the combination of the message numbers of the a pre-division pattern is "2, 4, 6".

FIG. 23 is a diagram illustrating an example of a message frequency table according to the fourth embodiment. A message frequency table 512 is stored in the storage unit 510. The message frequency table 512 is a tabulation of the frequency of appearance for each message number by the pattern re-dividing unit 530. The message frequency table 512 includes the items of message number and frequency of appearance.

Message numbers are registered under the item of message number. The tabulation results of the frequency of appearance obtained at the upstream detection servers 200 and 200a are registered under the item of frequency of appearance. For example, the message number "6" has a frequency of appearance of "61". The message frequency table 512 sorts the record in descending order of frequency of appearance.

Next, procedures for updating distribution tables in the information processing system according to the fourth embodiment will be described. Note that the processing procedures for failure detection in the fourth embodiment are the same as with the procedures in the second embodiment described with reference to FIGS. 11 through 13.

Figure 24:
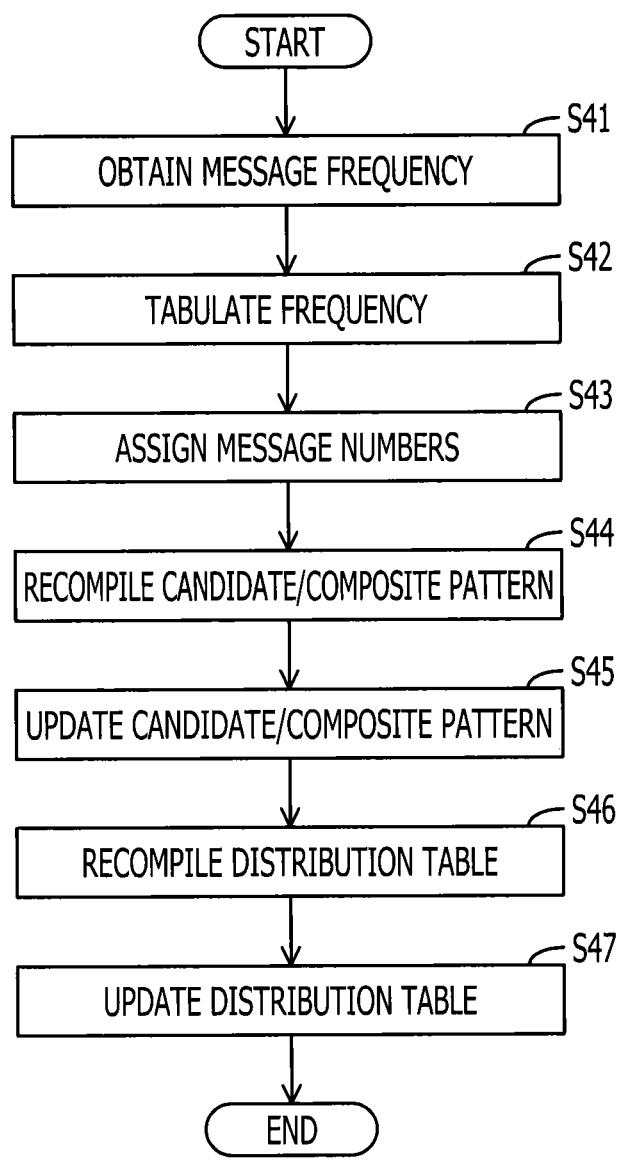
FIG. 24 is a flowchart illustrating an example of distribution table updating according to the fourth embodiment.

FIG. 24 is a flowchart illustrating an example of distribution table updating. The processing illustrated in FIG. 24 will now be described following the operation numbers.

(S41) The message frequency obtaining unit 520 obtains information of frequency of appearance for each message number from the upstream detection servers 200 and 200a, and outputs to the pattern re-dividing unit 530. The cycle of obtaining may be determined in accordance to operation of the information processing system. Examples of obtaining cycles may be every 24 hours, once a week, or the like.

(S42) The pattern re-dividing unit 530 tabulates the frequency of appearance for each message number, based on the information of frequency of appearance that has been obtained. The pattern re-dividing unit 530 registers the tabulation results in the message frequency table 512.

(S43) The pattern re-dividing unit 530 assigns message numbers to the two servers such that the frequency of appearance of the message numbers handled by the upstream detection servers 200 and 200a becomes equal. For example, the pattern re-dividing unit 530 may assign the message numbers in the message frequency table 512 sorted in descending order of frequency of appearance in order from the top, such that "6, 7, 2" is assigned to the upstream detection server 200 and "3, 5, 4" is assigned to the upstream detection server 200a. In the case where there are three or more upstream detection servers, assignment is made in the order of being sorted by the frequency of appearance.

(S44) The pattern re-dividing unit 530 references the pre-division pattern table 511 stored in the storage unit 510, and recompiles the candidate patterns and composite patterns based on the assignment results of message numbers in S43. For example, with regard to the example of message number assignation illustrated in S43, candidate pattern "2, 6" is created for branch number "1-1", and this is assigned to the upstream detection server 200. Also, candidate pattern "4" is created for branch number "1-1", and this is assigned to the upstream detection server 200a. Composite pattern "1:1-1, 2:1-1" is created for the branch number "1-1", and this is assigned to the downstream detection server 300.

(S45) The pattern re-dividing unit 530 transmits the created candidate patterns to the upstream detection servers 200 and 200a, so as to update the candidate pattern tables 211 and 211a held in the upstream detection servers 200 and 200a. The pattern re-dividing unit 530 transmits the created composite pattern to the downstream detection server 300, so as to update the composite pattern table 311 held at the downstream detection server 300.

(S46) The pattern re-dividing unit 530 notifies the distribution table compilation unit 540 of the assignation results of message numbers in S43. The distribution table compilation unit 540 compiles a distribution table based on the assignation results.

(S47) The distribution table compilation unit 540 transmits the compiled distribution table to the servers-to-be-monitored 100, 100a, and 100b, so as to update the distribution tables which the servers-to-be-monitored 100, 100a, and 100b hold.

Thus, the distribution table compilation server 500 updates the distribution tables of the servers-to-be-monitored 100, 100a, and 100b, in accordance with the frequency of appearance of message numbers. Also, the distribution table compilation server 500 divides pre-division patterns registered in the pre-division pattern table 511 in accordance with assignation results of distribution destinations, and reassigns the candidate/composite patterns to be detected to the upstream detection servers 200 and 200a, and downstream detection server 300. At this time, in the distribution table, the message numbers and the upstream detection servers 200 and 200a, are correlated in a one-on-one manner. That is to say, there is no redundancy of elements (message numbers) for the sets of message numbers assigned to the upstream detection servers 200 and 200a.

The distribution table compilation server 500 assigns message numbers such as the frequency of appearance of message numbers which the upstream detection servers 200 and 200a handle is equalized. That is to say, the distribution table compilation server 500 effects control such that message data does not concentrate on one upstream detection server. Accordingly, the load of the upstream detection servers 200 and 200a, can be dynamically equalized.

Next, a fifth embodiment will be described. Description will be made primarily with regard to differences as to the above-described second through fourth embodiments, and description of points held in common will be omitted.

With the second and fourth embodiments, an example has been described with regard to a two-stage arrangement of upstream detection servers 200 and 200a and the downstream detection server 300. Now, in the event that the number of failures to detect becomes great, the number of candidate patterns for the upstream detection servers 200 and 200a to detect increases, and the load of pattern determination processing by the upstream detection servers 200 and 200a or the downstream detection server 300 may become great. Accordingly, an arrangement may be made where another upstream detection server is provided, and multiple stages of detection servers which perform narrowing down of candidate patterns before the downstream detection server 300 combines the candidate patterns may be provided. Thus, the load on the detection servers can be alleviated. The fifth embodiment proposes a function of detecting failures in multiple stages of three stages or more.

The information processing system according to the fifth embodiment includes, in addition to the servers of the information processing system according to the second embodiment described with reference to FIG. 2, upstream detection servers 200b and 200c, and mid-stream detection servers 300a and 300b. The upstream detection servers 200b and 200c, and mid-stream detection servers 300a and 300b, are coupled to the network 10. A hardware example of the upstream detection servers 200b and 200c, and mid-stream detection servers 300a and 300b, is the same as the hardware example of the upstream detection server 200 described with reference to FIG. 3. Other devices and the like will be referred to using the same names and reference numerals as with the second embodiment.

Figure 25:
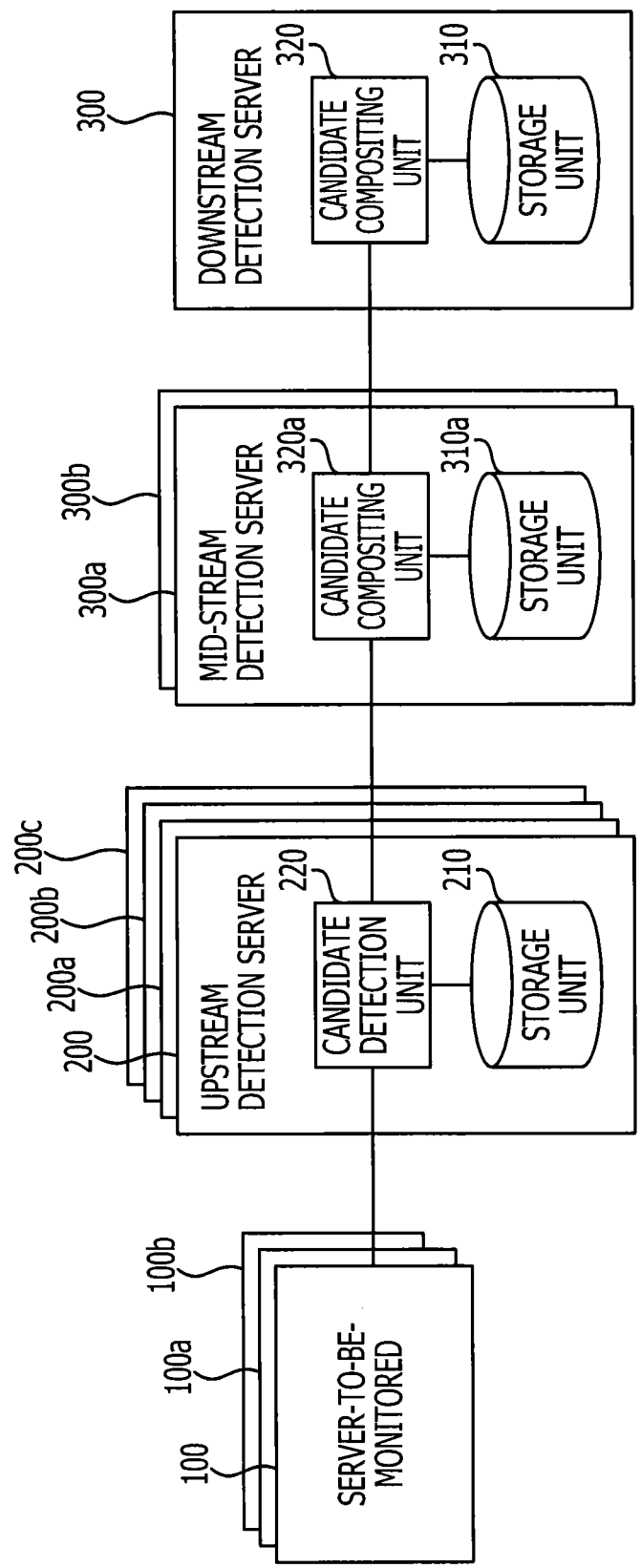
FIG. 25 is a diagram illustrating a software example according to a fifth embodiment.

FIG. 25 is a diagram illustrating an example of software with the first embodiment. Part of all of the units illustrated in FIG. 25 may be program modules executed by the upstream detection servers 200a, 200b, and 200c, mid-stream detection servers 300a and 300b, and downstream detection server 300. Also, part or all of the units illustrated in FIG. 25 may be electronic circuits such as an FPGA or ASIC or the like. The upstream detection servers 200, 200a, 200b, and 200c may also be realized using similar hardware as with the upstream detection server 200. Further, the mid-stream detection servers 300a and 300b may also be realized using similar hardware as with the downstream detection server 300. The servers-to-be-monitored 100, 100a, and 100b include the units described with the second embodiment.

Now, the example of the software of the upstream detection server 200 is the same as with that described with FIG. 4. Note however, that the storage unit 210 stores a distribution table of candidate patterns, in which is registered which of the mid-stream detection servers 300a and 300b to transmit the candidate pattern notification data to. The candidate detection unit 220 references the distribution table of the candidate patterns, and transmits the candidate pattern notification data to one of the mid-stream detection servers 300a and 300b.

Also, the example of the software of the downstream detection server 300 is the same as with that described with FIG. 4. Note however, that composite patterns are detected by the candidate compositing unit 320 based on combinations of candidate pattern notification data received from the mid-stream detection servers 300a and 300b.

The mid-stream detection server 300a has a storage unit 310a and candidate compositing unit 320a.

The storage unit 310a stores a candidate pattern table. The candidate pattern table of the storage unit 310a has registered therein branch numbers of candidate patterns corresponding to a detected composite pattern. Also, the storage unit 310a stores candidate pattern notification data.

The candidate compositing unit 320a stores the candidate pattern notification data received from the upstream detection servers 200, 200a, 200b, and 200c in the storage unit 310a.

The candidate compositing unit 320a detects a composite pattern from the sets of candidate patterns notified from the upstream detection servers 200, 200a, 200b, and 200c, based on the candidate pattern table stored in the storage unit 310a. The candidate compositing unit 320a transmits the candidate pattern notification data corresponding to the detected composite pattern to the downstream detection server 300. Thus, the candidate compositing unit 320a generates new candidate patterns by consolidating the candidate patterns notified from the upstream detection servers 200, 200a, 200b, and 200c.

The candidate compositing unit 320a can also be said to be performing narrowing down of candidate patterns.

FIGS. 26A through 26D are diagrams illustrating candidate pattern tables (upstream) according to the fifth embodiment. FIG. 26A illustrates an example of a candidate pattern table 212 which the upstream detection server 200 holds in the storage unit 210. FIG. 26B illustrates an example of a candidate pattern table 212a which the upstream detection server 200a holds in its own storage unit 210a. FIG. 26C illustrates an example of a candidate pattern table 212b which the upstream detection server 200b holds in the storage unit 210b. FIG. 26D illustrates an example of a candidate pattern table 212c which the upstream detection server 200c holds in the storage unit 210c. The candidate pattern tables 212, 212a, 212b, and 212c, include the items of failure number, related message, branch number, and candidate patterns. The contents of the items is the same as the contents of the items of the candidate pattern table 211 described with reference to FIG. 7.

FIGS. 27A and 27B are diagrams illustrating an example of candidate pattern tables (mid-stream) according to the fifth embodiment. FIG. 27A illustrates an example of a candidate pattern table 311a which the mid-stream detection server 300a holds in its own storage unit 310a. FIG. 27B illustrates an example of a candidate pattern table 311b which the mid-stream detection server 300b holds in the storage unit 310b. The candidate pattern tables 311a and 311b include the items of failure number, branch number and composite pattern.

Failure numbers are registered under the item of failure number. Branch numbers are registered under the item of branch numbers. Composite patterns are registered under the item of composite pattern.

For example, with the candidate pattern table 311a, the composite pattern for branch number "1-2" of failure number "1" is "1:1:1-2, 1:2:1-2". With the notation of "1:1:1-2", the first half ""1:1" means the server number of the upstream detection server (in this case, the upstream detection server 200), and the second half "1-2" indicates the branch number corresponding to the candidate pattern detected with the upstream detection server. That is to say, the notation of "1:1:1-2" indicates the candidate pattern of the branch number "1-2" detected with the upstream detection server 200.

Here, with the fifth embodiment, the server number of the upstream detection server 200 is "1:1". The server number of the upstream detection server 200a is "1:2". The server number of the upstream detection server 200b is "2:1". The server number of the upstream detection server 200c is "2:2". The server number of the mid-stream detection server 300a is "1". The server number of the mid-stream detection server 300b is "2".

Accordingly, the composite pattern "1:1:1-2, 1:2:1-2" in the candidate pattern table 311a can be detected when information of candidate pattern with branch number "1-2" has been obtained from the upstream detection servers 200 and 200a.

Also, for example, with the candidate pattern table 311a, the composite pattern of branch number "1-3" is "1:2:1-3". This composite pattern can be detected when information of candidate pattern with branch number "1-3" has been obtained from the upstream detection server 200a.

Further, with the candidate pattern table 311a, the composite pattern for branch number "1-1" is "-", meaning not set.

The composite pattern table 311 which the downstream detection server 300 holds in the storage unit 310 is the same as that described with FIG. 8. Note however, that the server which the server number in this composite pattern table 311 (the numeral before the colon ":" in the composite pattern) is different. That is to say, the server number "1" indicates the mid-stream detection server 300a. The server number "2" indicates the mid-stream detection server 300b.

Candidate/composite patterns corresponding to two or more, i.e., multiple failure numbers, can be registered in the above-described candidate pattern tables 212, 212a, 212b, 212c, 311a, and 311b.

FIGS. 28A and 28B are diagrams illustrating examples of candidate pattern notification data according to the fifth embodiment. FIG. 28A illustrates an example of candidate pattern notification data 700 transmitted from the upstream detection servers 200 and 200a, to the mid-stream detection servers 300a and 300b. The setting contents of the items of the candidate pattern notification data 700 are as described with reference to FIG. 10.

Candidate pattern notification data 700d, 700e, and 700f illustrate examples of cases where actual values have been set. This is an example where the message data 600d described with reference to FIG. 9 is collected at the upstream detection server 200, the message data 600a is collected at the upstream detection server 200a, and the message data 600b is collected at the upstream detection server 200b, respectively.

The candidate pattern notification data 700d has a server number of "1:1", start point-in-time of "2011/7/25 10:58:34", end point-in-time of "2011/7/25 10:58:34", and branch number of "1-2". The candidate pattern notification data 700d is generated by the candidate detection unit 220 based on the message data 600d, and is transmitted to the mid-stream detection server 300a.

Note that the mid-stream detection server 300a is registered in the distribution table of candidate patterns which the upstream detection server 200 holds, as the transmission destination of "1:1:1-2, 1:2:1-2". The candidate detection unit 220 can decide the transmission destination of the candidate pattern notification data 700d based on the distribution table (hereinafter, the transmission destinations of candidate pattern notification data of the upstream detection servers 200, 200a, 200b, and 200c are decided in the same way). Alternatively, instead of using a distribution table, the number before the colon ":" (e.g., "1") of the own server number (e.g., "1:1"), may be changed to the server number of the transmission destination server (e.g., "1").

The candidate pattern notification data 700e has a server number of "1:2", start point-in-time of "2011/7/25 10:58:30", end point-in-time of "2011/7/25 10:58:30", and branch number of "1-2". The candidate pattern notification data 700e is generated by the candidate detection unit of the upstream detection server 200a based on the message data 600a, and is transmitted to the mid-stream detection server 300a.

The candidate pattern notification data 700f has a server number of "2:1", start point-in-time of "2011/7/25 10:58:32", end point-in-time of "2011/7/25 10:58:33", and branch number of "1-2". The candidate pattern notification data 700f is generated by the candidate detection unit of the upstream detection server 200b based on the message data 600b and 600c, and is transmitted to the mid-stream detection server 300b.

FIG. 28B illustrates an example of candidate pattern notification data 700 transmitted from the mid-stream detection servers 300a and 300b to the downstream detection server 300. The setting contents of the items of the candidate pattern notification data 700 are as described with reference to FIG. 10.

Candidate pattern notification data 700g and 700h illustrate examples of cases where actual values have been set.

The candidate pattern notification data 700g has a server number of "1", start point-in-time of "2011/7/25 10:58:30", end point-in-time of "2011/7/25 10:58:30", and branch number of "1-2". The candidate pattern notification data 700g is generated by the candidate compositing unit 320a based on the candidate pattern notification data 700d and 700e, and is transmitted to the downstream detection server 300.

The candidate pattern notification data 700h has a server number of "2", start point-in-time of "2011/7/25 10:58:32", end point-in-time of "2011/7/25 10:58:33", and branch number of "1-2". The candidate pattern notification data 700 is generated by the composite pattern unit of the mid-stream detection server 300b based on the candidate pattern notification data 700f, and is transmitted to the downstream detection server 300.

Note that no candidate pattern of any branch number regarding a certain failure number is detected at the upstream detection servers 200, 200a, 200b, and 200c, and the mid-stream detection servers 300a and 300b, a negative pattern is notified to the downstream detection server. The candidate pattern notification data used for notifying a negative pattern is the same as with the candidate pattern notification data 700c described with reference to FIG. 10.

Next, processing procedures of the information processing system according to the fifth embodiment will be described. Now, the procedures for message distribution by the servers-to-be-monitored 100, 100a, and 100b according to the fifth embodiment are the same as the procedures described with reference to FIG. 11.

The procedures for candidate pattern detection by the upstream detection servers 200, 200a, 200b, and 200c is the same as with the procedures described with reference to FIG. 12. Note however, that the message data 600d described with reference to FIG. 9 is collected at the upstream detection server 200, the message data 600a is collected at the upstream detection server 200a, and the message data 600b is collected at the upstream detection server 200b, respectively. The upstream detection servers 200, 200a, 200b, and 200c according to the fifth embodiment transmit the candidate pattern notification data to one of the mid-stream detection servers 300a and 300b. The mid-stream detection servers 300a and 300b then store the received candidate pattern notification data.

Further, the procedures for candidate pattern detection by the downstream detection server 300 is the same as with the procedures described with reference to FIG. 13. Note however, that the downstream detection server 300 stores candidate pattern notification data received from the mid-stream detection servers 300a and 300b. The downstream detection server 300 detect failures based on the stored candidate pattern notification data.

The following is a description of procedures for candidate pattern detection by the mid-stream detection server 300a. The processing procedures of the mid-stream detection server 300b is also the same as that of the mid-stream detection server 300a.

Figure 29:
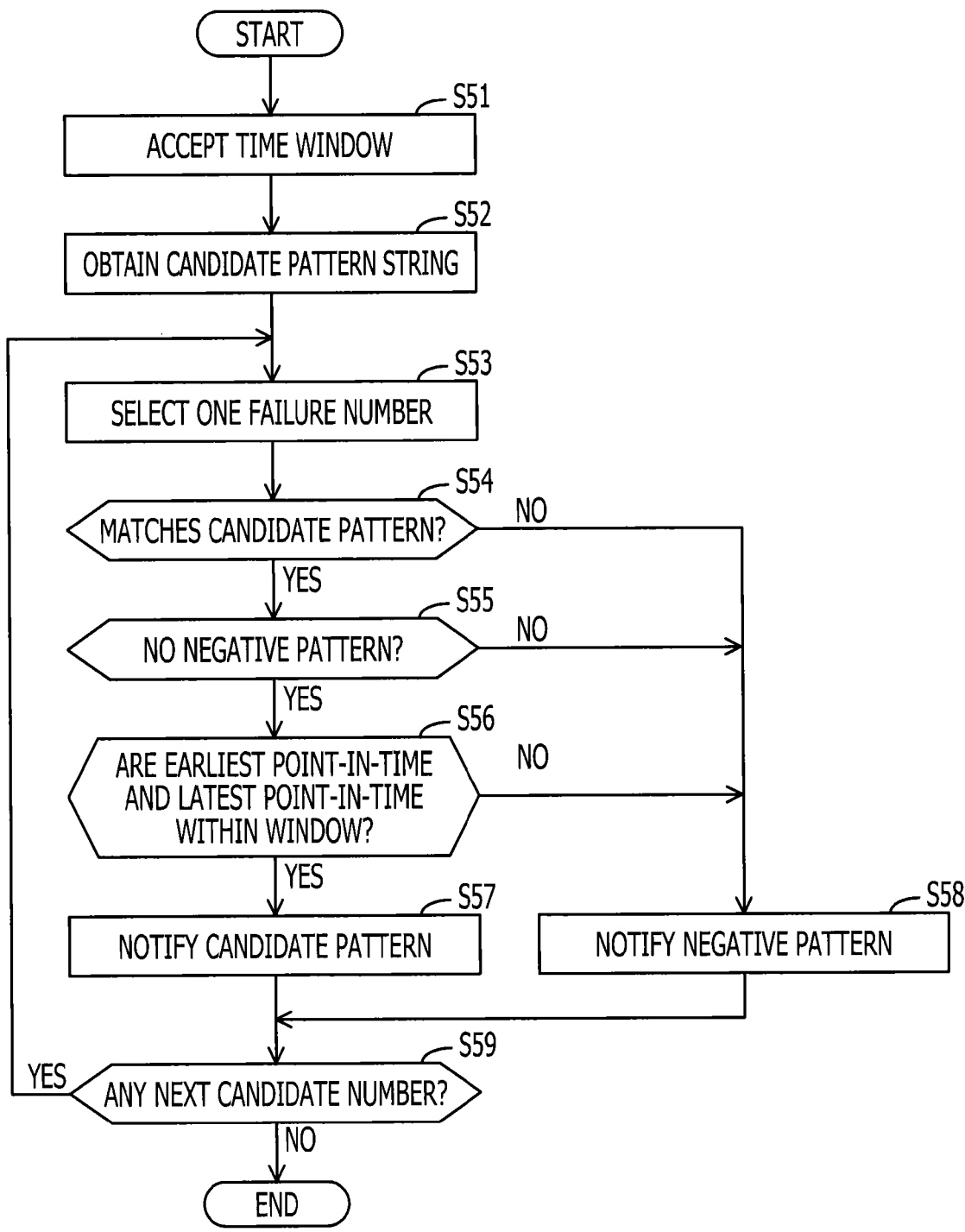
FIG. 29 is a flowchart illustrating an example of candidate pattern detection according to the fifth embodiment.

FIG. 29 is a flowchart illustrating an example of candidate pattern detection according to the fifth embodiment. The processing illustrated in FIG. 29 will now be described following the operation numbers.

(S51) The administrating terminal device 400 inputs a time window to the mid-stream detection server 300a. The candidate compositing unit 320a accepts input of the time window. The time range of the time window input to the mid-stream detection servers 300a and 300b is the same as the time range of the time window input to the upstream detection servers 200, 200a, 200b, and 200c and the downstream detection server 300. Note however, the time ranges may be different with at least a part overlapping. The administrating terminal device 400 may input the time window to the mid-stream detection servers 300a and 300b at the same time as inputting the time window to the upstream detection servers 200, 200a, 200b, and 200c and the downstream detection server 300. In this case, the subsequent S52 is started after having received the full set of candidate pattern notification data transmitted from the upstream detection servers 200, 200a, 200b, and 200c.

(S52) The candidate compositing unit 320a references candidate pattern notification data stored in the storage unit 310a, and obtains all candidate patterns (candidate pattern string) regarding which the end point-in-time is set within the time window.

(S53) The candidate compositing unit 320a references the composite pattern table 311a stored in the storage unit 310a, and selects one failure number.

(S54) The candidate compositing unit 320a references the composite pattern table 311a and determines whether or not the candidate pattern string matches with any composite pattern corresponding to the branch numbers of the failure number. In the event that there is a match with any composite pattern, the processing is advanced to S55.

(S55) The candidate compositing unit 320a references the candidate pattern notification data stored in the storage unit 310a, and determines whether or not there is a negative pattern of this failure number. In the event that there is no negative pattern, the processing is advanced to S56. In the event that there is a negative pattern, the processing is advanced to S58.

(S56) The candidate compositing unit 320a references the candidate pattern notification data stored in the storage unit 310a, and extracts the start point-in-time and end point-in-time corresponding to candidate patterns which are elements of the detected composite pattern. The candidate compositing unit 320a determines whether, of the extracted points-in-time, the earliest point-in-time and the latest point-in-time are both included in the time window. If included, the processing is advanced to S57. If not included, the processing is advanced to S58. Multiple composite patterns may be detected in S54. In such a case, if any one of the multiple composite patterns is included in the time window, the processing is advanced to S57. On the other hand, if none of the multiple composite patterns is included in the time window, the processing is advanced to S58.

(S57) The candidate compositing unit 320a generates candidate pattern notification data regarding the composite pattern detected from the message number string (only those included in the time window), and transmits this to the downstream detection server 300. For example, in the event that the candidate patterns string is a combination of "1:1:1-2" and "1:2:1-2", the candidate compositing unit 320a transmits the candidate pattern notification data 700g to the downstream detection server 300. In the event that there is candidate pattern with another branch number, candidate pattern notification data is also generated for that candidate pattern as well and is transmitted to the downstream detection server 300. Now, in the event that no message number is obtained as with the branch number "1-1" for example, there may be cases where determination is made in S54 that there is a match with a composite pattern. In this case, the candidate compositing unit 320a does not notify candidate patterns to the downstream detection server 300.

(S58) The candidate compositing unit 320a generates negative pattern notification data regarding the failure number selected in S53, and transmits this to the downstream detection server 300. For example, with the candidate pattern table 311a, the failure number "1" has branch numbers "1-1", "1-2", and "1-3". In this case, a negative pattern is notified in the event that no composite pattern of any of these branch numbers could be detected from the candidate pattern string (No in S54) or the negative pattern "−1" for failure number "1" has been obtained as candidate pattern notification data (No in S55). Thereupon, the candidate compositing unit 320a generates the candidate pattern notification data 700c with the negative pattern "−1" of failure number "1" set, and transmits to the downstream detection server 300.

(S59) The candidate compositing unit 320a takes the failure number selected in S53 has having been processed. The candidate compositing unit 320a references the candidate pattern table 311a and determines whether or not there is a next failure number (unprocessed failure number). In the event that there is a next failure number, the flow is advanced to S53. In the event that there is no next failure number, the processing is ended.

Thus, candidate patterns are narrowed down at the mid-stream detection servers 300a and 300b, based on the candidate pattern combinations received from the upstream detection servers 200, 200a, 200b, and 200c.

In S52 above, the candidate compositing unit 320a may reference the candidate pattern notification data stored in the storage unit 310a and obtain all candidate patterns of which the start point-in-time and the end point-in-time are both within the time window (candidate patterns string). In this case, S56 may be skipped and advanced to S57.

Now, with a large-scale information processing system, the failure contents to be monitored may be great in amount. In such cases, the load on upstream detection servers can be distributed by increasing the number of the upstream detection servers so as to collect a greater amount of message data. Also, the load on the downstream detection server can be distributed by providing mid-stream detection servers and narrowing down failure candidates. Thus, processing load on the detection servers can be efficiently alleviated.

While description has been made here of an example of three stages, the mid-stream detection servers may be divided into multiple stages so as to have four or more stages. For example, in the case of having N (where N is an integer of 3 or greater) stages, a group of three or more of the detection servers is provided at the first stage. From the second stage, a group of mid-stream detection servers is provided at the N−1'th stage (second stage when N=3). The mid-stream detection server group includes one or more mid-stream detection server per stage. The downstream detection server is then provided at the N'th stage (final stage). The number of stages of detection servers can be flexibly decided according to operations so that the detection servers are not overloaded.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A failure detection method to detect failures of an information processing device coupled to a plurality of computers based on a plurality of types of messages output by the information processing device, the failure detection method comprising:

transmitting, by the information processing device, one or more first messages to a first computer among the plurality of computers and transmitting one or more second messages to a second computer among the plurality of computers, each type of the one or more first messages belonging to a first group and each type of the one or more second messages belonging to a second group different from the first group;

generating, by the first computer, first failure candidate information including information of the each type of the one or more first messages, and transmitting the first failure candidate information to a third computer;

generating, by the second computer, second failure candidate information including information of the each type of the one or more second messages, and transmitting the second failure candidate information to the third computer; and detecting, by the third computer, the failure of the information processing device based on the first failure candidate information and the second failure candidate information, wherein the plurality of types are divided into a plurality of groups of which elements do not overlap, the plurality of groups including the first group and the second group, with a computer having been assigned to each of the plurality of types as a collection destination.

2. The failure detection method according to claim 1, further comprising:
changing types of messages collected by the first computer and the second computer based on each frequency of the plurality of types of messages outputted from the information processing device.

3. The failure detection method according to claim 2, wherein the changing includes:
obtaining information of frequency of appearance of each of the plurality of types of messages; and
changing the types of messages collected by the first computer and the second computer such that the frequency of appearance is equalized.

4. The failure detection method according to claim 3, wherein the type of messages collected by the first computer and the second computer are changed in order of being sorted by the frequency of appearance of each of the plurality of types of messages.

5. The failure detection method according to claim 1, further comprising:
dividing failure patterns of types of messages corresponding to particular failures into a plurality of partial patterns;
assigning a first partial pattern out of the plurality of partial patterns to the first computer; and
assigning a second partial pattern out of the plurality of partial patterns to the second computer,
wherein the generating of the first failure candidate information includes generating the first failure candidate information when the first partial pattern has been detected from a combination of types of the first messages collected by the first computer, and
wherein the generating of the second failure candidate information includes generating the second failure candidate information when the second partial pattern has been detected from a combination of types of the second messages collected by the second computer.

6. The failure detection method according to claim 5, wherein, when the first partial pattern is not detected from a combination of types of first messages collected by the first computer, information indicating negation of the particular failure is generated,
wherein, when the second partial pattern is not detected from a combination of types of second messages collected by the second computer, information indicating negation of the particular failure is generated, and
wherein, when information indicating negation of at least any of the particular failures has been generated, the particular failures are not generated.

7. The failure detection method according to claim 1, further comprising:
acquiring output point-in-time of the first messages when the first messages are collected at the first computer; and
acquiring output point-in-time of the second messages when the second messages are collected at the second computer, and
wherein the generating of the first failure candidate information includes generating, when information of time range is received, the first failure candidate information based on messages among the first messages, the output point-in-time of the messages among the first messages being within the time range, and
wherein the generating of the second failure candidate information includes generating, when the information of time range is received, the second failure candidate information based on messages among the second messages, the output point-in-time of the messages among the second messages being within the time range.

8. The failure detection method according to claim 1,
wherein the plurality of computers includes:
a first-stage node group including the first computer and the second computer and one or more computers;
an intermediate node group including one or more computers; and
a final stage node, and
wherein the detecting includes:
generating third candidate information by narrowing down a plurality of failure candidate information including the first failure candidate information and the second failure candidate information;
collecting, by the final stage node, the third candidate information; and
detecting the failure of the information processing device based on the third candidate information.

9. The failure detection method according to claim 1, further comprising:
obtaining numbers corresponding to the plurality of types of messages by referring a storage unit which stores information of numbers corresponding to each of the plurality of types; and
determining collection destination nodes based on a remainder of having divided the numbers by the number of collection destination nodes.

10. The failure detection method according to claim 9, wherein the collection destination nodes are determined by whether the remainder is odd.

11. A failure detection system to detect failures of an information processing device based on a plurality of types of messages output by the information processing device, the failure detection system comprising:
a first computer configured to:
receive one or more first messages from the information processing device; and
generate first failure candidate information including information of each type of the one or more first messages, the each type of the one or more first messages belonging to a first group, a second computer configured to:
receive one or more second messages from an information processing device; and
generate second failure candidate information including information of the each type of the one or more second messages, the each type of the one or more second messages belonging to a second group different from the first group, and
a third computer configured to:
receive the first failure candidate information from the first computer;
receive the second failure candidate information from the second computer; and
detect the failure of the information processing device based on the first failure candidate information and the second failure candidate information,
wherein the plurality of types are divided into a plurality of groups of which elements do not overlap, the plurality of groups including the first group and the second group, with a computer having been assigned to each of the plurality of types as a collection destination.

12. The failure detection method according to claim 11, further comprising:
changing types of messages collected by the first computer and the second computer based on each frequency of the plurality of types of messages outputted from the information processing device.

13. The failure detection method according to claim 12, wherein the changing includes:
obtaining information of frequency of appearance of each of the plurality of types of messages; and
changing the types of messages collected by the first computer and the second computer such that the frequency of appearance is equalized.

14. The failure detection method according to claim 13, wherein the type of messages collected by the first computer and the second computer are changed in order of being sorted by the frequency of appearance of each of the plurality of types of messages.

15. The failure detection method according to claim 11, further comprising:
obtaining numbers corresponding to the plurality of types of messages by referring a storage unit which stores information of numbers corresponding to each of the plurality of types; and
determining collection destination nodes based on a remainder of having divided the numbers by the number of collection destination nodes.

16. The failure detection method according to claim 15, wherein the collection destination nodes are determined by whether the remainder is odd.

17. The failure detection method according to claim 11, further comprising:
dividing failure patterns of types of messages corresponding to particular failures into a plurality of partial patterns;
assigning a first partial pattern out of the plurality of partial patterns to the first computer; and
assigning a second partial pattern out of the plurality of partial patterns to the second computer,
wherein the generating of the first failure candidate information includes generating the first failure candidate information when the first partial pattern has been detected from a combination of types of the first messages collected by the first computer, and
wherein the generating of the second failure candidate information includes generating the second failure candidate information when the second partial pattern has been detected from a combination of types of the second messages collected by the second computer.

18. A failure detection method executed by a system having a plurality of nodes and detecting failures at an information processing device based on a plurality of types of messages output by the information processing device, the method comprising:
collecting messages belonging to a first set, which is a part of the plurality of types, at a first node;
collecting messages belonging to a second set different from the first set, which is a part of the plurality of types, at a second node;
generating first failure candidate information based on messages of the type belonging to the first set, collected at the first node;
generating second failure candidate information based on messages of the type belonging to the second set, collected at the second node; and
detecting failure at the information processing device, based on the first failure candidate information and the second failure candidate information,
wherein the plurality of types is divided into a plurality of sets of which elements do not overlap, the plurality of sets including the first set and the second set, with a node having been assigned to each of the plurality of types as a collection destination, and
wherein, at the time of collecting messages, a storage unit storing information of numbers corresponding to each of the plurality of types is referred to so as to obtain numbers corresponding to the plurality of types of messages, and collection destination nodes are determined based on a remainder of having divided the numbers by the number of collection destination nodes.

19. The failure detection method according to claim 18, wherein the collection destination nodes are determined by whether the remainder is odd.

* * * * *